(12) United States Patent
Michels

(10) Patent No.: US 11,753,197 B2
(45) Date of Patent: Sep. 12, 2023

(54) PACKAGING STATION AND METHOD OF OPERATING A PACKAGING STATION

(71) Applicant: Kellogg Company, Battle Creek, MI (US)

(72) Inventor: John Joseph Michels, Portage, MI (US)

(73) Assignee: KELLOGG COMPANY, Battle Creek, MI (US)

(*) Notice: Subject to any disclaimer, the term of this patent is extended or adjusted under 35 U.S.C. 154(b) by 421 days.

(21) Appl. No.: 16/988,951

(22) Filed: Aug. 10, 2020

(65) Prior Publication Data

US 2020/0369418 A1    Nov. 26, 2020

Related U.S. Application Data

(62) Division of application No. 15/862,699, filed on Jan. 5, 2018, now Pat. No. 10,773,845.
(Continued)

(51) Int. Cl.
*B65B 43/30* (2006.01)
*B65B 61/06* (2006.01)
(Continued)

(52) U.S. Cl.
CPC ............. *B65B 43/30* (2013.01); *B65B 1/02* (2013.01); *B65B 1/06* (2013.01); *B65B 1/16* (2013.01);
(Continued)

(58) Field of Classification Search
CPC .............. B65B 1/16; B65B 1/36; B65B 43/30
(Continued)

(56) References Cited

U.S. PATENT DOCUMENTS 2,670,887 A * 3/1954 Landgraber, Sr. ...... B65B 5/045
53/385.1
3,254,828 A   6/1966 Lerner
(Continued)

FOREIGN PATENT DOCUMENTS

DE        2703455       10/1977
DE    102014210234     12/2014
(Continued)

OTHER PUBLICATIONS

PCT/US2018/012453 International Search Report dated May 23, 2018.

*Primary Examiner* — Praachi M Pathak
(74) *Attorney, Agent, or Firm* — Honigman LLP

(57) ABSTRACT

An apparatus includes a product metering device, first and second container preparation systems, and a controller. The product metering device is configured to dispense a product. The first and second container preparation systems are configured to dispense first and second containers, respectively, for receiving the product from the product metering device. The first and second container preparation systems include first and second severed container material transporting devices, respectively, operable to transport the first and second containers, respectively, from the first and second container preparation systems, respectively, to the product metering device. The controller simultaneously controls (i) one of the first container preparation system and the second container preparation system to prepare one of the first container and the second container, and (ii) the product metering device to dispense the product into the other of the first container and the second container.

10 Claims, 25 Drawing Sheets

Related U.S. Application Data

(60) Provisional application No. 62/443,301, filed on Jan. 6, 2017.

(51) Int. Cl.

| | | |
|---|---|---|
| *B65B 43/54* | (2006.01) | |
| *B65B 1/06* | (2006.01) | |
| *B65B 1/16* | (2006.01) | |
| *B65B 1/36* | (2006.01) | |
| *B65B 35/12* | (2006.01) | |
| *B65B 43/12* | (2006.01) | |
| *B65B 43/46* | (2006.01) | |
| *B65B 57/00* | (2006.01) | |
| *B65B 41/16* | (2006.01) | |
| *B65B 1/02* | (2006.01) | |
| *B65B 43/36* | (2006.01) | |

(52) U.S. Cl.
CPC ............. *B65B 1/36* (2013.01); *B65B 35/12* (2013.01); *B65B 41/16* (2013.01); *B65B 43/123* (2013.01); *B65B 43/36* (2013.01); *B65B 43/465* (2013.01); *B65B 43/54* (2013.01); *B65B 57/00* (2013.01); *B65B 61/06* (2013.01); *B65B 2210/02* (2013.01); *G05B 2219/45048* (2013.01)

(58) Field of Classification Search
USPC ..................................... 53/55, 558, 202, 168
See application file for complete search history.

(56) References Cited

U.S. PATENT DOCUMENTS

| | | | |
|---|---|---|---|
| 3,359,703 A | 12/1967 | Quaadgras | |
| 4,018,032 A * | 4/1977 | Dempsey | B65B 5/101 53/247 |
| 4,117,649 A | 10/1978 | Egli | |
| 4,269,016 A * | 5/1981 | Kopp | B65B 65/006 53/563 |
| 4,291,520 A * | 9/1981 | Prince | B29C 66/81431 53/374.6 |
| 4,545,180 A * | 10/1985 | Chung | B65B 1/02 53/562 |
| 4,617,785 A | 10/1986 | Chikatani et al. | |
| 5,024,042 A * | 6/1991 | Meyer | B65B 43/28 53/252 |
| 5,448,879 A * | 9/1995 | Concetti | B65B 1/02 53/284.7 |
| 5,452,559 A * | 9/1995 | Lipes | B65B 43/465 53/67 |
| 5,544,466 A * | 8/1996 | Bonnet | B65B 51/00 53/253 |
| 5,743,071 A * | 4/1998 | Wolthuizen | B65B 5/045 53/493 |
| 6,779,321 B1 * | 8/2004 | Kelemen | B65B 25/04 53/567 |
| 6,935,087 B2 * | 8/2005 | Simon | B65B 25/061 53/529 |
| 7,290,382 B2 | 11/2007 | Imao | |
| 7,325,386 B2 | 2/2008 | Kissling | |
| 7,448,185 B2 | 11/2008 | Zeedyk | |
| 7,866,123 B2 * | 1/2011 | Clusserath | B67C 7/002 141/144 |
| 9,352,867 B2 * | 5/2016 | Actis | B65B 39/12 |
| 9,845,169 B2 * | 12/2017 | Smith | B65G 53/04 |
| 2007/0084154 A1 * | 4/2007 | Kissling | B65B 9/023 53/551 |

FOREIGN PATENT DOCUMENTS

| | | |
|---|---|---|
| EP | 0390190 | 3/1990 |
| WO | 2009/011754 | 1/2009 |

* cited by examiner

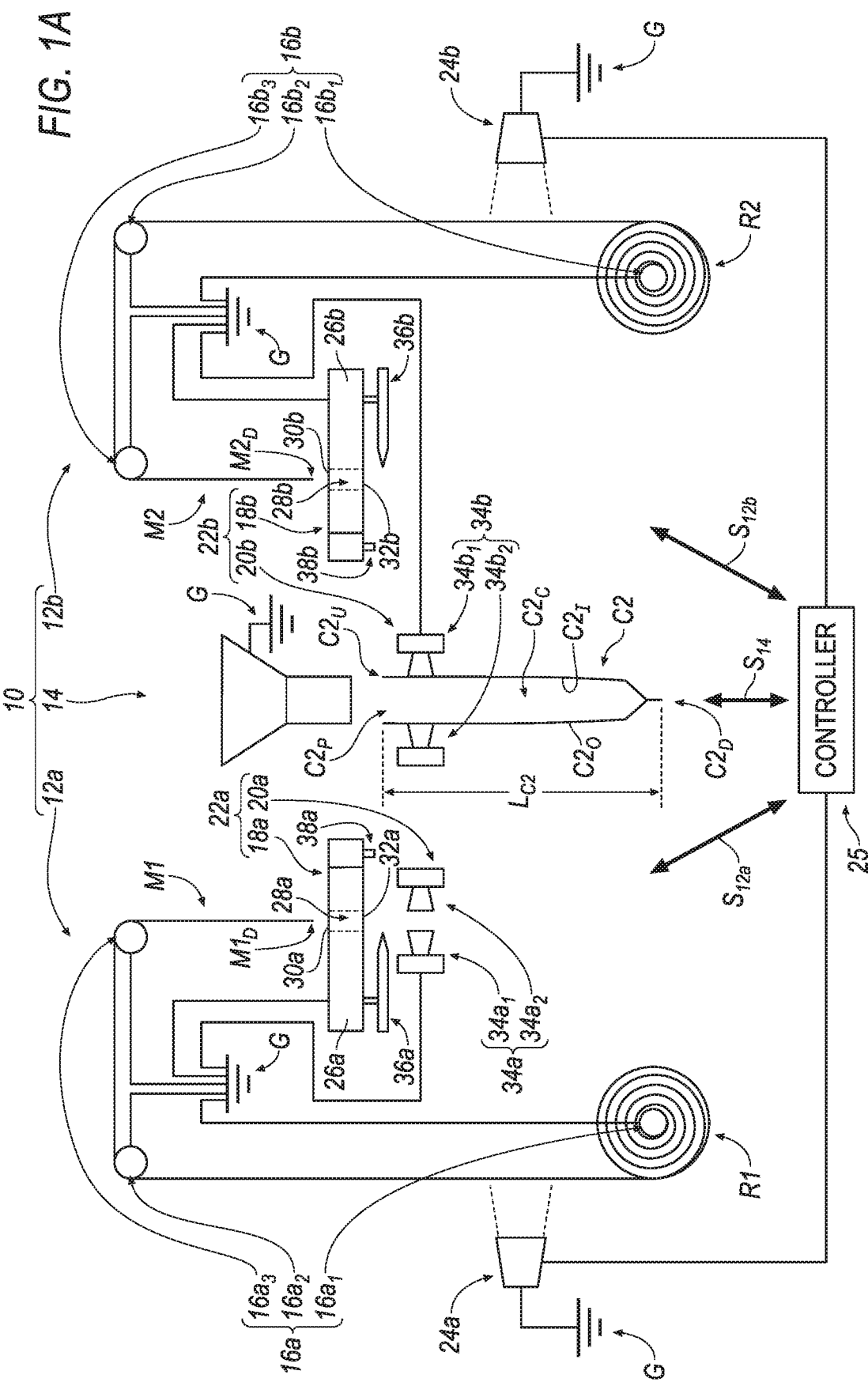

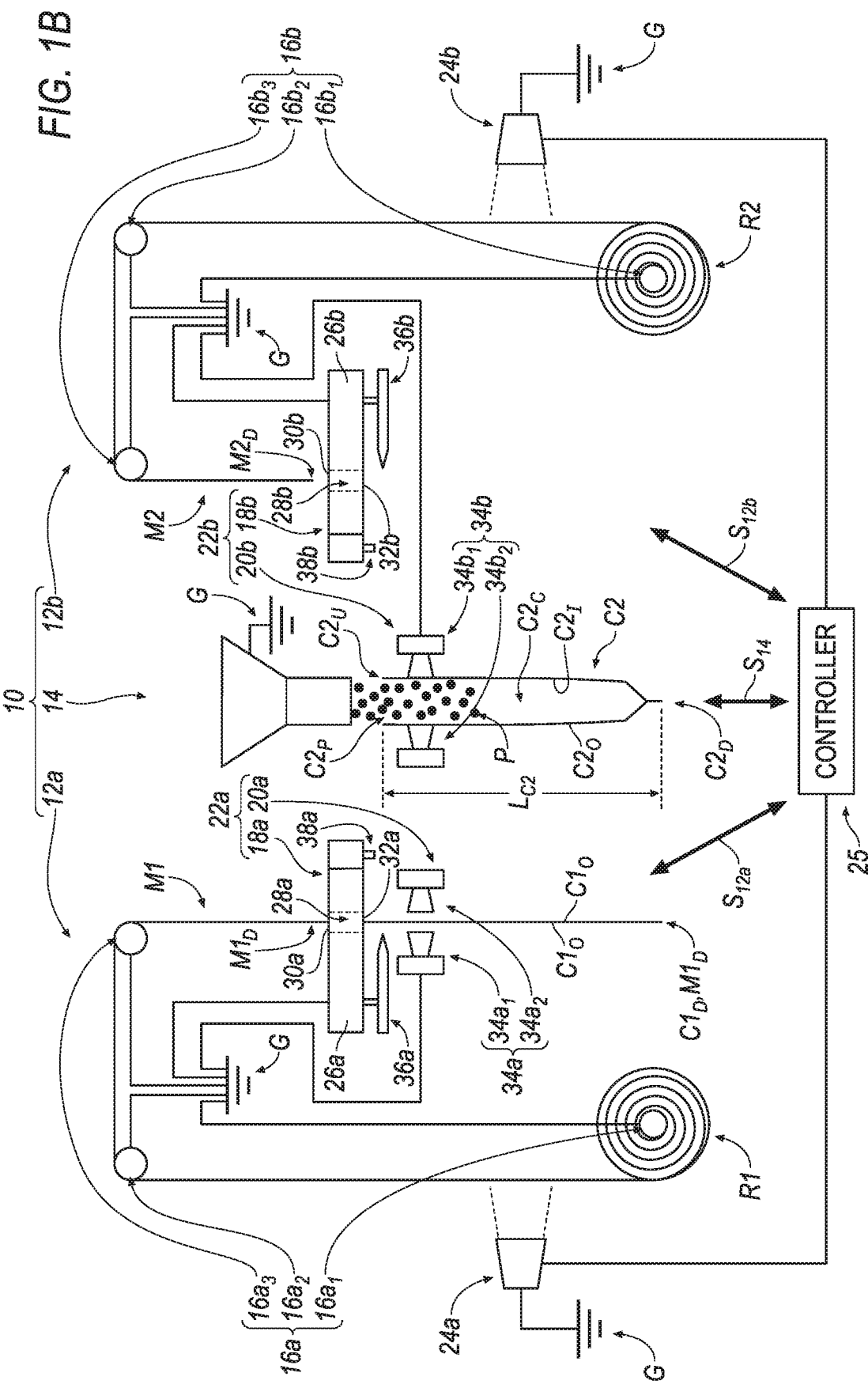

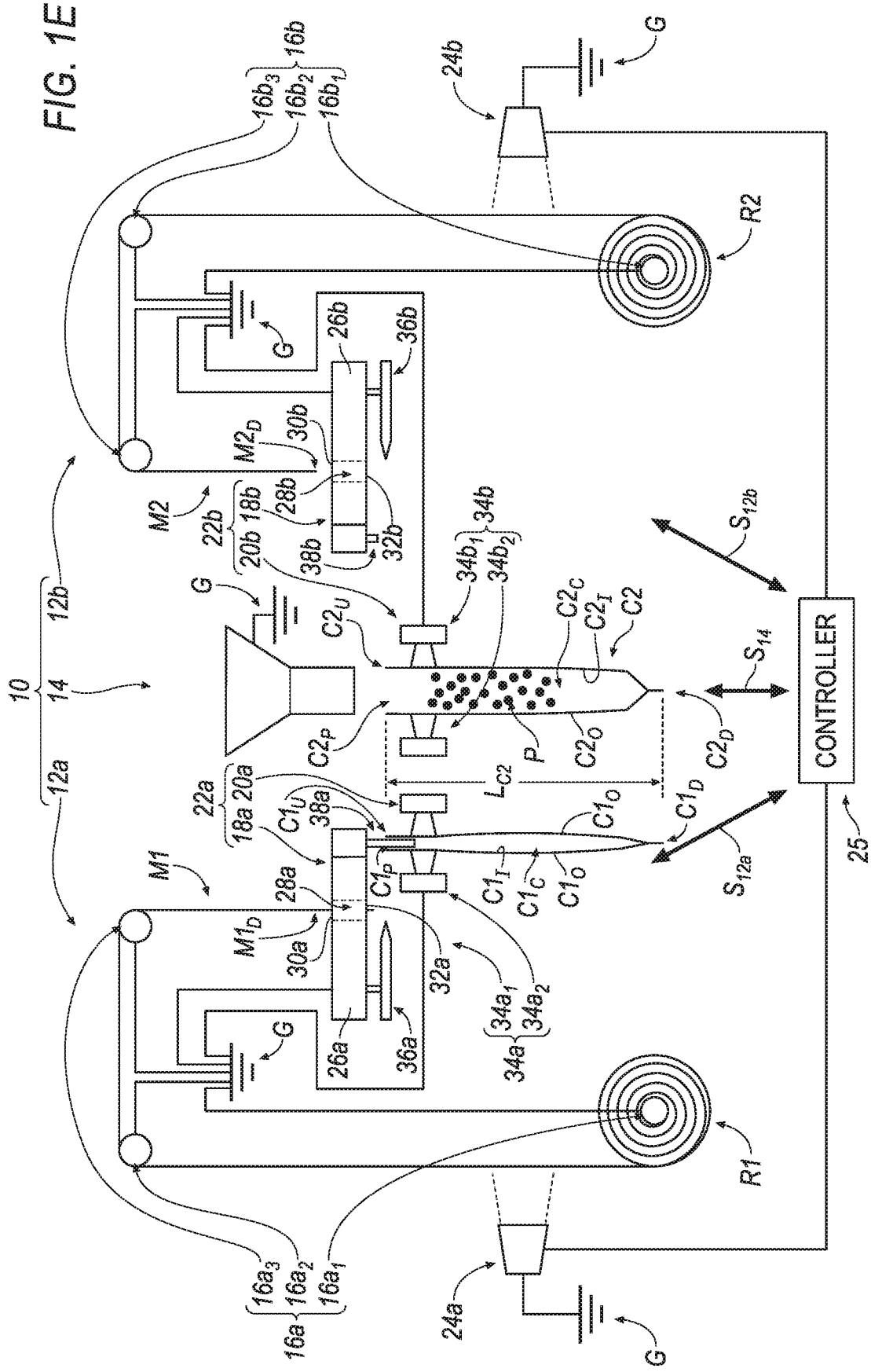

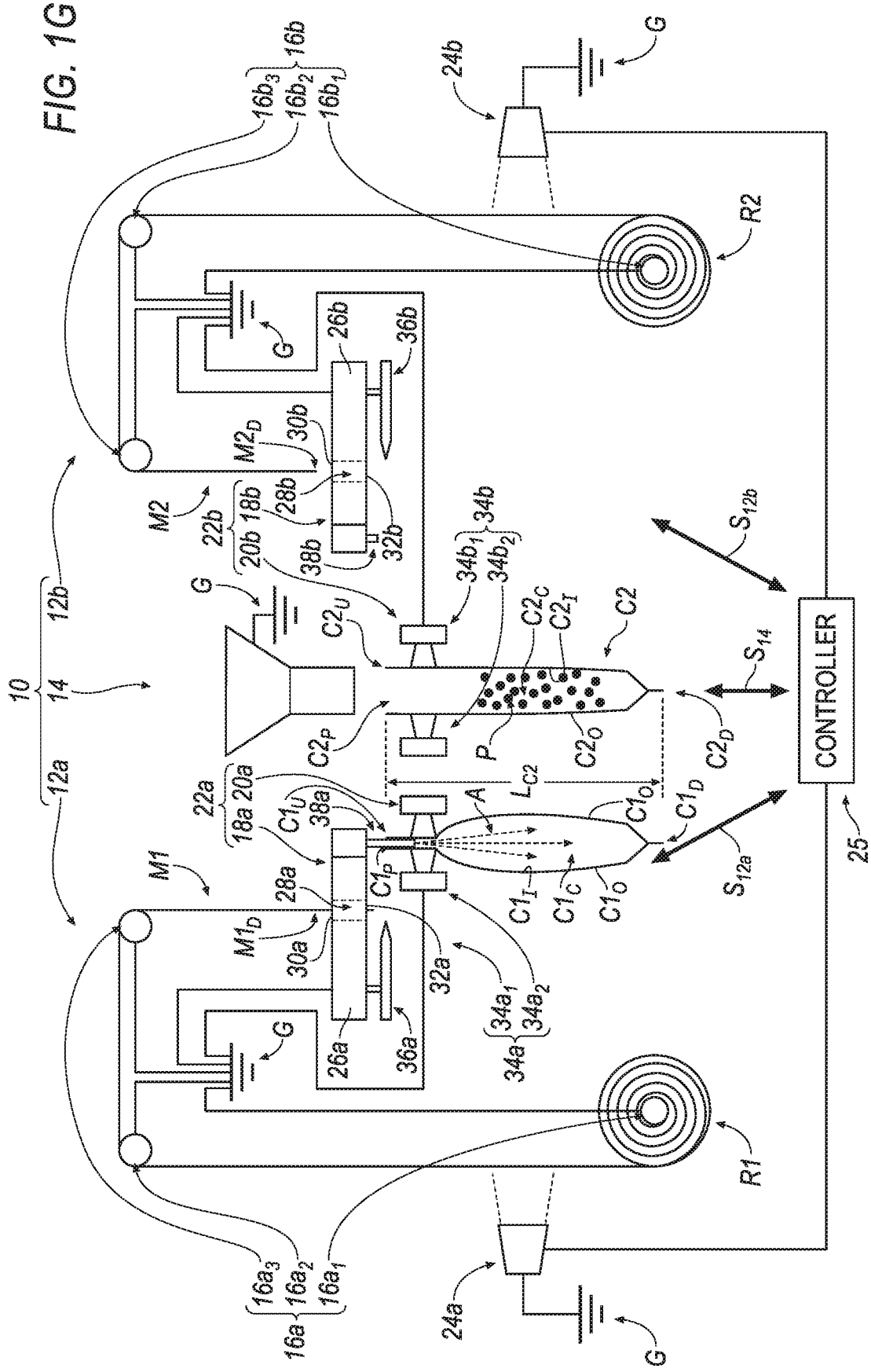

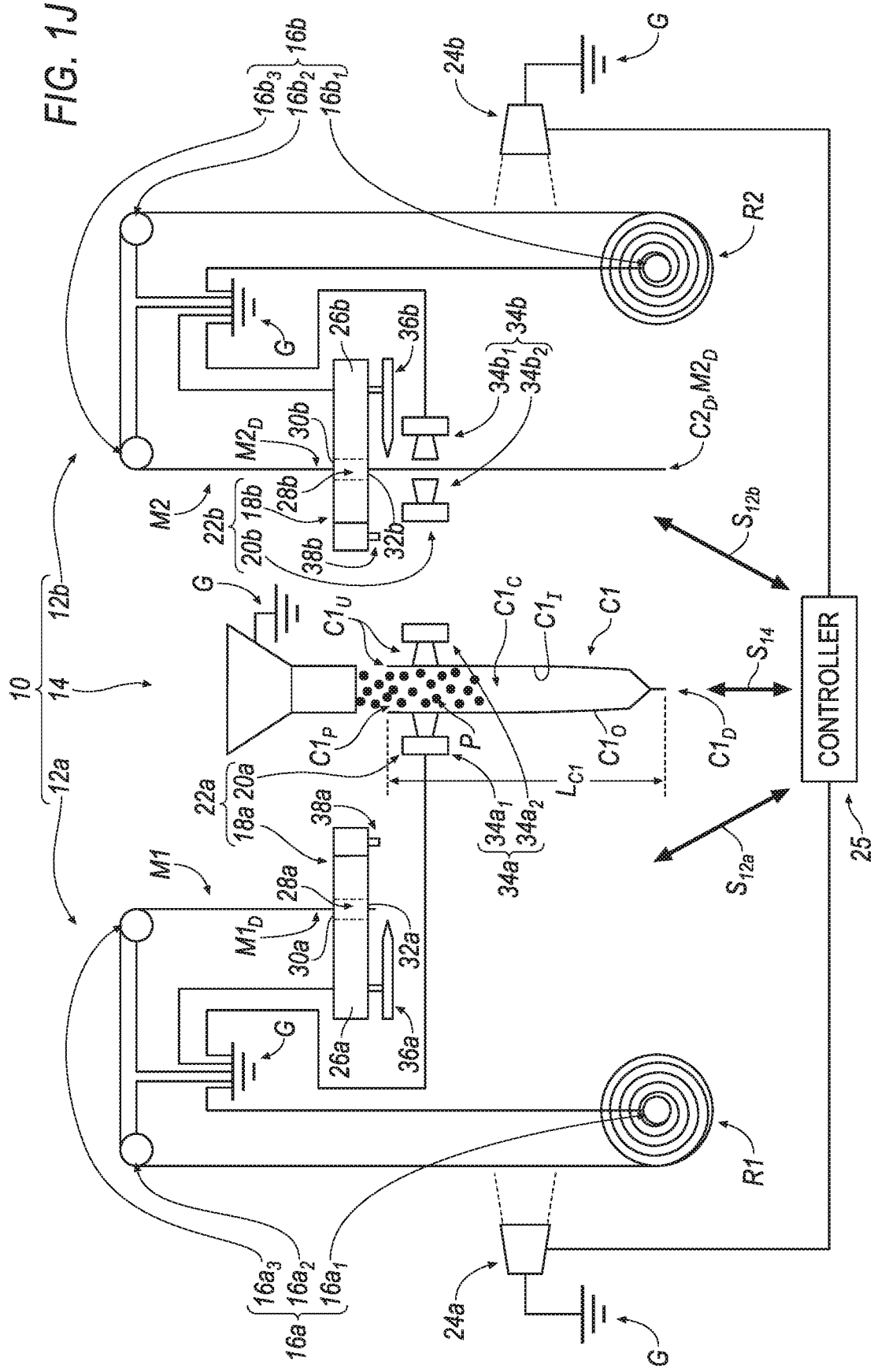

PACKAGING STATION AND METHOD OF OPERATING A PACKAGING STATION

CROSS REFERENCE TO RELATED APPLICATION

This application is a divisional of U.S. patent application Ser. No. 15/862,699, filed Jan. 5, 2018, which claims the benefit of and priority under 35 U.S.C. § 119(e) to U.S. Provisional Application No. 62/443,301, filed on Jan. 6, 2017, both of which are incorporated herein by reference in their entirety.

TECHNICAL FIELD

This disclosure relates to a packaging station and a method for operating the same.

BACKGROUND

Packaging stations are known. While existing packaging stations perform adequately for their intended purpose, improvements to packaging stations are continuously being sought in order to advance the arts.

SUMMARY

This section provides a general summary of the disclosure, and is not a comprehensive disclosure of its full scope or all of its features.

One aspect of the disclosure provides a packaging station. The packaging station includes a product metering device, a first container preparation system and a second container preparation system. The first container preparation system is interfacingly-arranged with the product metering device. The second container preparation system is interfacingly-arranged with the product metering device. Each of the first container preparation system and the second container preparation system includes a container material severing device and a severed container material transporting device.

Implementations of the disclosure may include one or more of the following optional features. For example, the container material severing device cooperates with the severed container material transporting device to define a container expander.

In some implementations, the container material severing device includes a body and a material severing portion. The body defines a container material-receiving passage accessible by an upstream opening and a downstream opening. The material portion extends from the body and is configured for severing container material extending through the downstream opening.

In some examples, the severed container material transporting device includes at least one pair of container material engaging portions. The at least one pair of container material engaging portions is defined by a first container material engaging portion and a second container material engaging portion.

In some implementations, the container expander includes an inflator portion. The inflator portion extends away from the body of the container material severing device.

In some implementations, each of the first container preparation system and the second container preparation system includes a plurality of container material support members. The plurality of container material support members includes a first support member, a second support member and a third support member. One of the first support member, the second support member and the third support member supports a roll of a length of container material defining a plurality of unprepared containers that are un-severed and not expanded and not inflated.

In some examples, the packaging station includes a controller and means for sensing. Each of the first container preparation system and the second container preparation system includes the means for sensing. The means for sensing senses one or more characteristics of the length of container material defining a plurality of unprepared containers as the length of container material is drawn away from the roll to cause the controller to send an actuation signal to one or more of the first container preparation system and the second container preparation system for preparing a container from the plurality of unprepared containers of the length of container material drawn from the roll. The controller is also configured to send a signal to the product metering device for metering an amount of product into the container prepared by one of the first container preparation system and the second container preparation system.

Another aspect of the disclosure provides a method. The method includes: actuating one of a first container preparation system and a second container preparation system for defining a first severed and expanded container; metering a first amount of product from a product metering device into the first severed and expanded container for defining a first severed, expanded and filled container; transporting the first severed, expanded and filled container away from the product metering device; actuating the other of the first container preparation system and the second container preparation system for defining a second severed and expanded container; and metering a second amount of product from the product metering device into the second severed and expanded container for defining a second severed, expanded and filled container.

Implementations of the disclosure may include one or more of the following optional features. For example, the step of actuating one of the first container preparation system and the second container preparation system for defining the first severed and expanded container includes: drawing a first length of container material from a first roll. The actuating the other of the first container preparation system and the second container preparation system for defining the second severed and expanded container step includes: drawing a second length of container material from a second roll.

In some implementations, the step of actuating one of the first container preparation system and the second container preparation system for defining the first severed and expanded container further includes: severing the first length of container material for separating a portion of the first length of container material from the first roll for defining a first severed and non-expanded container. The step of actuating the other of the first container preparation system and the second container preparation system for defining the second severed and expanded container includes: severing the second length of container material for separating a portion of the second length of container material from the second roll for defining a second severed and non-expanded container.

In some examples, the first container preparation system includes a first material severing portion for severing the first length of container material for separating a portion of the first length of container material from the first roll. The second container preparation system includes a second material severing portion for severing the second length of container material for separating a portion of the second length of container material from the second roll.

In some implementations, the step of actuating one of the first container preparation system and the second container preparation system for defining the first severed and expanded container further includes: inflating the first severed and non-expanded container for defining the first severed and expanded container. The step of actuating the other of the first container preparation system and the second container preparation system for defining the second severed and expanded container includes: inflating the second severed and non-expanded container for defining the second severed and expanded container.

In some examples, the first container preparation system includes a first inflator portion for inflating the first severed and non-expanded container. The second container preparation system includes a second inflator portion for inflating the second severed and non-expanded container.

In some implementations, the first container preparation system includes at least one first pair of container material engaging portions for transporting the first severed and non-expanded container from the first material severing portion to the first inflator portion. The second container preparation system includes at least one second pair of container material engaging portions for transporting the second severed and non-expanded container from the second material severing portion to the second inflator portion.

In some examples, the first container preparation system includes at least one first pair of container material engaging portions for transporting the first severed, expanded and filled container away from the product metering device. The second container preparation system includes at least one second pair of container material engaging portions. The method further includes transporting the second severed, expanded and filled container away from the product metering device.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

Like reference symbols in the various drawings indicate like elements.

DETAILED DESCRIPTION

Figure 1C:
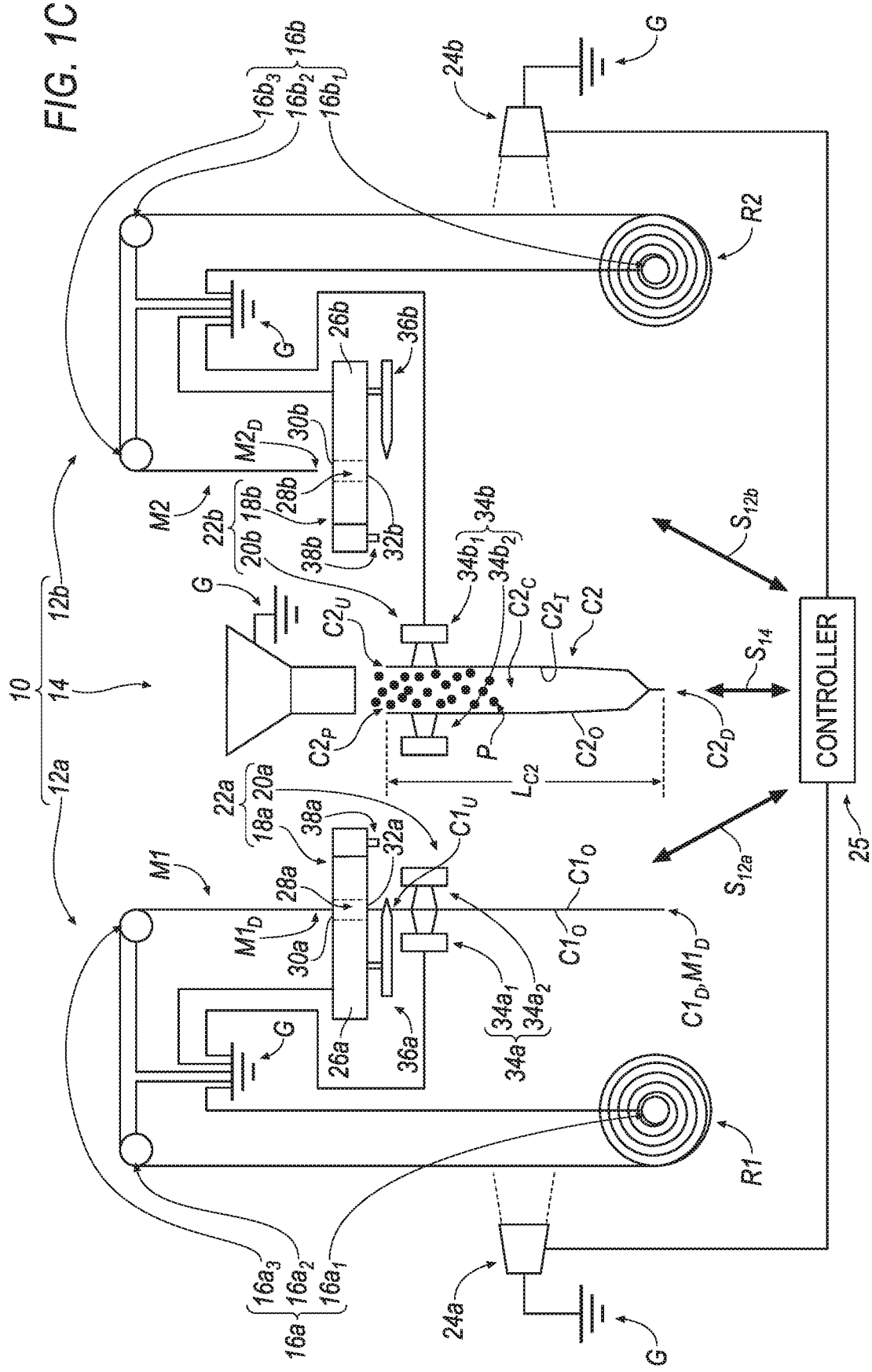
FIGS. 1A-1O are side views illustrating operation of an exemplary packaging system including a first container preparation system, a second container preparation system, and a product metering device.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Referring to FIGS. 1A-1O, an exemplary implementation of a packaging station is shown generally at 10. The packaging station 10 includes a first container preparation system 12a that prepares at least one first container C1 (see, e.g., FIG. 1I), a second container preparation system 12b that prepares at least one second container C2 (see, e.g., FIG. 1A) and a product metering device 14 that meters an amount of a product P (see, e.g., FIGS. 1B-1H and FIGS. 1J-1O) into each of the at least one first container C1 and the at least one second container C2. Each of the first container preparation system 12a, the second container preparation system 12b and the product metering device 14 may be supported by a body (not shown) extending from an underlying ground surface G (i.e., the first container preparation system 12a, the second container preparation system 12b and the product metering device 14 may be said to be interfaceably-connected to one another by a common ground surface G). Although an exemplary implementation of a first container preparation system 12a and a product metering device 14 are shown in FIGS. 2A-2J (with a "box" representing the second container preparation system 12b), the views represented in FIGS. 2A-2J are not meant to be construed as a view of an alternative packaging system including one container preparation system but as a partial schematic view of an exemplary implementation of a packaging station 10 corresponding to FIGS. 1A-1O (i.e., although the second container preparation system 12b is not schematically shown at FIGS. 2A-2J but represented as a "box," the second container preparation system 12b may be substantially the same as and operate in a substantially similar manner as the first container preparation system 12a at FIGS. 2A-2J).

Referring to FIGS. 1A-1O, the first container preparation system 12a and the second container preparation system 12b are arranged relative to the product metering device 14 such that the first container preparation system 12a and the second container preparation system 12b are permitted to be alternatingly movably-interfaced with the product metering device 14 such that: (1) while the first container preparation system 12a is in the process of preparing a first container C1, or while the second container preparation system 12b is in the process of preparing a second container C2, the other of: (2) a first container C1 that was previously prepared by the first container preparation system 12a, or a second container C2 that was previously prepared by the second container preparation system 12b, is being filled with product P by the product metering device 14. Because the first container preparation system 12a and the second container preparation system 12b are alternatingly movably-interfaced with the product metering device 14 as described above, the packaging station 10 realizes increased efficiencies as a prepared first container C1 (see, e.g., FIG. 1H), or a prepared second container C2, is in a "ready position" after a filled first container C1, or a filled second container C2 (see, e.g., FIG. 1H), is shuttled away (see, e.g., FIGS. 1H-1I) from the product metering device 14.

Referring to FIG. 1A, each of the first container preparation system 12a and the second container preparation system 12b is shown including a plurality of container material support members 16a, 16b. Each of the plurality of container material support members 16a, 16b may be supported by a body (not shown) extending from the underlying ground surface G. Each of the plurality of container material support members 16a, 16b may include a first support member $16a_1$, $16b_1$, a second support member $16a_2$, $16b_2$ and a third support member $16a_3$, $16b_3$.

The first support member $16a_1$ of the first container preparation system 12a may include a roller member, bar or the like that supports a roll R1 of a length of container material M1 defining a plurality of unprepared first containers C1 that are joined to one another by a plurality of segmenting portions (see, e.g., $M1_S$ of FIGS. 2A-2J). In an example, as referenced in FIG. 1I, each unprepared first container C1 of the plurality of unprepared first containers C1 defining the length of container material M1 that is reeled from the roll R1 is defined by a length $L_{C1}$ that extends between a downstream end $C1_D$ of the first container C1 and an upstream end $C1_U$ of the first container C1. The downstream end $C1_D$ of the first container C1 is sealed and the upstream end $C1_U$ of the first container C1 is not sealed; because the upstream end $C1_U$ of the first container C1 is not sealed, the upstream end $C1_U$ of the first container C1 thereby defines an upstream passage $C1_P$ (e.g., an opening) of the first container C1 for permitting access to a product-receiving cavity $C1_C$ formed by an inner sidewall surface $C1_I$ of the first container C1 and the sealed downstream end $C1_D$ of the first container C1. In this regard, in some implementations, the first container C1 defines a bag formed by the material M1.

The first support member $16b_1$ of the second container preparation system 12b may include a roller member, bar or the like that supports a roll R2 of a length of container material M2 defining a plurality of unprepared second containers C2 that are joined to one another by a plurality of segmenting portions (see, e.g., $M1_S$ of FIGS. 2A-2J). As seen, for example, in FIG. 1A, each unprepared second container C2 of the plurality of unprepared second containers C2 defining the length of container material M2 that is reeled from the roll R2 is defined by a length $L_{C2}$ that extends between a downstream end $C2_D$ of the second container C2 and an upstream end $C2_U$ of the second container C2. The downstream end $C2_D$ of the second container C2 is sealed and the upstream end $C2_U$ of the second container C2 is not sealed; because the upstream end $C2_U$ of the second container C2 is not sealed, the upstream end $C2_U$ of the second container C2 thereby defines an upstream passage $C2_P$ (e.g., an opening) of the second container C2 for permitting access to a product-receiving cavity $C2_C$ formed by an inner sidewall surface $C2_I$ of the second container C2 and the sealed downstream end $C2_D$ of the second container C2. In this regard, in some implementations, the second container C2 defines a bag formed by the material M2.

Although the length of container material M1, M2 defining the plurality of unprepared containers C1, C2 that are joined to one another by a plurality of segmenting portions $M1_S$, $M2_S$ is described above as being provided in the form of a roll R1, R2 that is arranged upon a roller member $16a_1$, $16b_1$, the length of container material M1, M2 is not limited to being provided in such a manner. For example, the length of container material M1, M2 may be may be folded such that, for example, each segmenting portion (see, e.g., $M1_{S1}$-$M1_{Sn}$, $M2_{S1}$-$M2_{Sn}$) of the plurality of segmenting portions $M1_S$, $M2_S$ is arranged in a stacked configuration; such an arrangement may be referred to as 'festoon-folding' or 'fan-folding' the length of container material M1, M2. In an example, when the length of container material M1, M2 is arranged in a stacked configuration as described above, the length of container material M1, M2 may not be arranged upon the roller member $16a_1$, $16b_1$, but, rather, within a box, container or the like that is supported by an underlying ground surface G. If the length of container material M1, M2 were to be provided from a box, container, or the like, the packaging station 10 will operate in a similar manner when the length of container material M1, M2 is arranged upon a roller member $16a_1$, $16b_1$.

The second support member $16a_2$, $16b_2$ of each of the first container preparation system 12a and the second container preparation system 12b may be a pulley, roller member or bar that supports a portion of the length of container material M1, M2 that is drawn away from the roll R1, R2, respectively. The third support member $16a_3$, $16b_3$ may be a pulley, roller member or bar that supports a portion of the length of container material M1, M2 that is drawn away from the roll R1, R2, respectively. The second support member $16a_2$, $16b_2$ is arranged downstream of the first support member $16a_1$, $16b_1$, and the third support member $16a_3$, $16b_3$ is arranged downstream of the second support member $16a_2$, $16b_2$.

With continued reference to FIG. 1A, each of the first container preparation system 12a and the second container preparation system 12*b* is shown including a first container material manipulator 18*a*, 18*b*. The first container material manipulator 18*a*, 18*b* may be alternatively referred to as a container material severing device that severs a first container C1 or a second container C2 from the length of container material M1, M2 that is drawn away from the roll R1, R2, respectively.

With continued reference to FIG. 1A, each of the first container preparation system 12*a* and the second container preparation system 12*b* is shown including a second container material manipulator 20*a*, 20*b*. The second container material manipulator 20*a*, 20*b* may be alternatively referred to as a severed container material transporting device that transports a first container C1, a second container C2 that was severed from the length of container material M1, M2 by the container material severing device 18*a*, 18*b*, respectively.

Furthermore, as seen, for example, in FIGS. 1D-1G and 1L-1O, each of the first container preparation system 12*a* and the second container preparation system 12*b* is shown including a third container material manipulator 22*a*, 22*b*. The third container material manipulator 22*a*, 22*b* may be alternatively referred to as a container expander that expands (e.g., inflates) the first container C1, or the second container C2, respectively, that was severed from the length of container material M1, M2, respectively. As seen in FIGS. 1D-1G and 1L-1O, the container material severing device 18*a*, 18*b* is interfaced with the severed container material transporting device 20*a*, 20*b* for collectively defining the container 22*a*, 22*b* in order to expand the first container C1 or the second container C2, respectively.

Figure 2A:
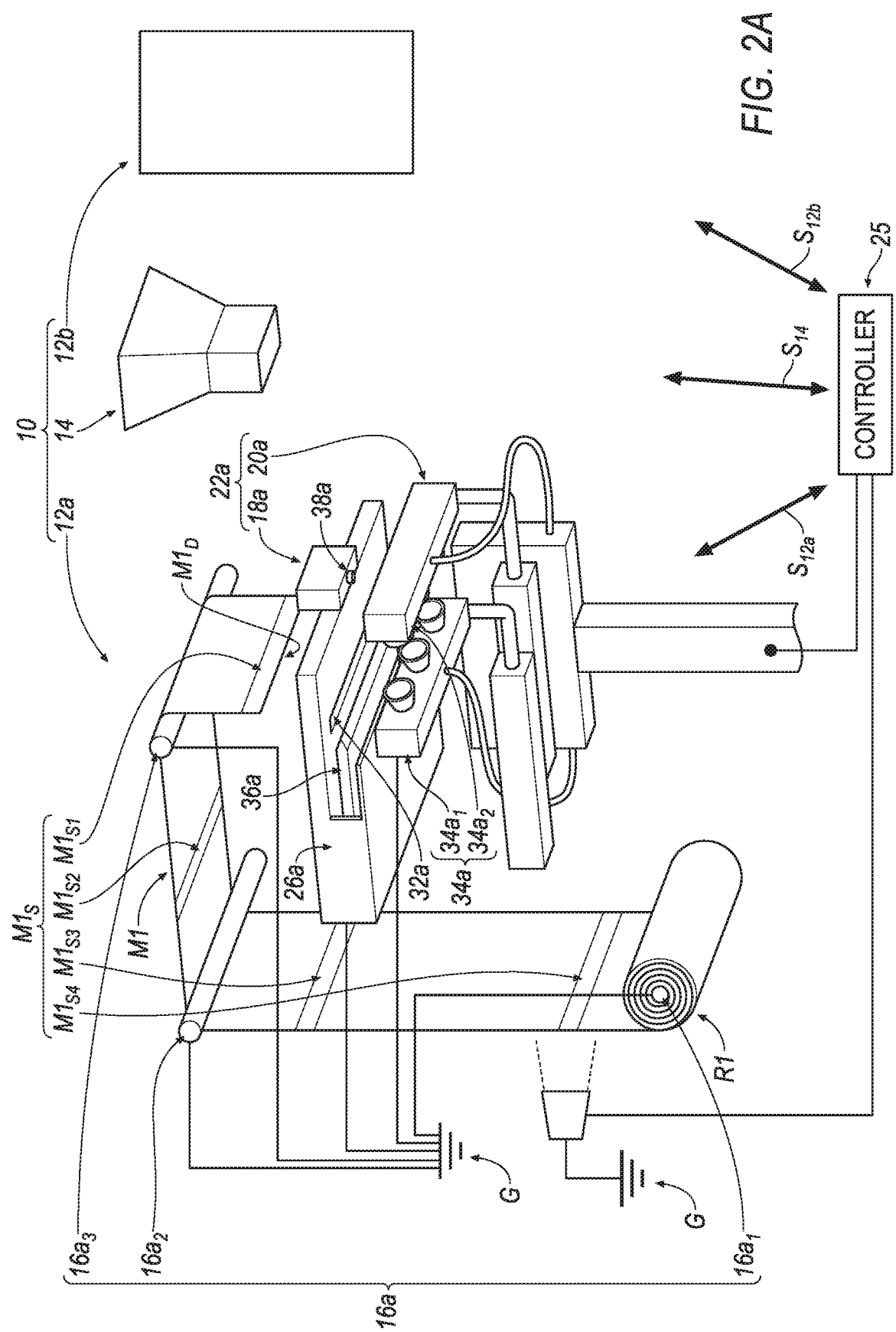
FIGS. 2A-2J are perspective views of an exemplary packaging system including a schematic view of a first container preparation system and a product metering device along with a representative view of a second container preparation system.

Referring back to FIG. 1A each of the first container preparation system 12*a* and the second container preparation system 12*b* may optionally include a sensor 24*a*, 24*b*. The sensor 24*a*, 24*b* may sense one or more features or characteristics of the length of container material M1, M2 as such length of container material M1, M2 is drawn away from the roll R1, R2, respectively. With reference to FIG. 2A, in an example, each segmenting portion (see, e.g., $M1_{S1}$-$M1_{Sn}$) of the plurality of segmenting portions (see, e.g., $M1_S$) demarcates an unprepared upstream container C1, C2 from an unprepared downstream container C1, C2, respectively. In an example, the sensor 24*a*, 24*b* may be arranged relative the length of container material M1, M2 in order to optically detect a segmenting portion (see, e.g., $M1_{S1}$, $M1_{S2}$, $M1_{S3}$, $M1_{S4}$, $M1_{S5}$ ... $M1_{Sn}$) of the plurality of segmenting portion $M1_S$ as the length of container material M1, M2 is drawn away from the roll R1, R2, respectively. Upon detecting the segmenting portion (e.g., $M1_{S1}$, $M1_{S2}$, $M1_{S3}$, $M1_{S4}$, $M1_{S5}$ ... $M1_{Sn}$) of the plurality of segmenting portion $M1_S$, the sensor 24*a*, 24*b* may send a signal to a controller 25 that may send an actuation signal (see, e.g., $S_{12a}$/$S_{12b}$ in FIGS. 1A-1O) to an actuator (not shown) associated with one or more of the container material severing device 18*a*, 18*b*, the severed container material transporting device 20*a*, 20*b* and the container expander 22*a*, 22*b* for actuating one or more components of the container material severing device 18*a*, 18*b*, the severed container material transporting device 20*a*, 20*b* and the container expander 22*a*, 22*b*. Furthermore, the sensor 24*a*, 24*b* may also send a signal to the controller 25 that may send an actuation signal (see, e.g., $S_{14}$ in FIGS. 1A-1O) to an actuator (not shown) associated with the product metering device 14 for causing the product metering device 14 to meter an amount of product P into the first container C1 or the second container C2. The controller 25 may be communicatively-coupled to any component of the packaging system 10 in any desirable manner (e.g., a hardwired connection, a wireless connection, or a combination of a hardwired and wireless connection).

Referring to FIG. 1A, the second container preparation system 12*b* is shown arranging a prepared second container C2 under the product metering device 14 in response to a signal (see, e.g., $S_{12b}$) sent from the controller 25 to the second container preparation system 12*b*. As seen in FIG. 1B, the product metering device 14 is actuated (e.g., by way of an actuation signal $S_{14}$ sent from the controller 25 to the product metering device 14) for filling the prepared second container C2 with a metered amount of a product P (e.g., cereal, potato chips, crisps or the like).

Referring to FIGS. 1B-1H, before and/or during actuation of the product metering device 14, one or more portions (see, e.g., the container material severing device 18*a*, the severed container material transporting device 20*a*, and the container expander 22*a*) of the first container preparation system 12*a* is/are actuated by way of, for example, an actuation signal (see, e.g., $S_{12a}$) sent from the controller 25 to the first container preparation system 12*a* for preparing a first container C1. As seen in FIG. 1I, once the prepared second container C2 including a metered amount of product P deposited therein is directed away from the product metering device 14, the first container preparation system 12*a* arranges a prepared first container C1 under the product metering device 14. As described below, and illustrated at FIGS. 1A-1I and 2A-2I, a methodology for preparing the first container C1 and subsequently arranging the prepared first container C1 under the product metering device 14 is described according to an exemplary embodiment.

Referring to FIGS. 1A and 2A, the length of container material M1 is drawn away from the roll R1 such that a distal end $M1_D$ of the length of container material M1 is arranged downstream of the plurality of container material support members 16*a*. As seen in FIGS. 1A and 2A, the distal end $M1_D$ of the length of container material M1 is arranged downstream of the third support member $16a_3$ of the plurality of container material support members 16*a*. Furthermore, the distal end $M1_D$ of the length of container material M1 may define a downstream end $C1_D$ of a leading first container C1 of a plurality of first containers C1 provided by the length of container material M1 that is drawn away from the roll R1.

Referring to FIG. 1A, the container material severing device 18*a* includes a body 26*a* (see also FIG. 2A) defining a passage 28*a* extending there-through. The passage 28*a* is accessible by an upstream opening 30*a* and a downstream opening 32*a* (see also FIG. 2A). As seen in FIGS. 1A and 2A, the distal end $M1_D$ of the length of container material M1 is arranged upstream of the container material severing device 18*a* such that the distal end $M1_D$ of the length of container material M1 is arranged opposite the upstream opening 30*a*. A device (not shown) for drawing the length of container material M1 from the roll R1 may be arranged within the passage 28*a* for drawing the length of container material M1 from the roll R1.

Figure 2B:
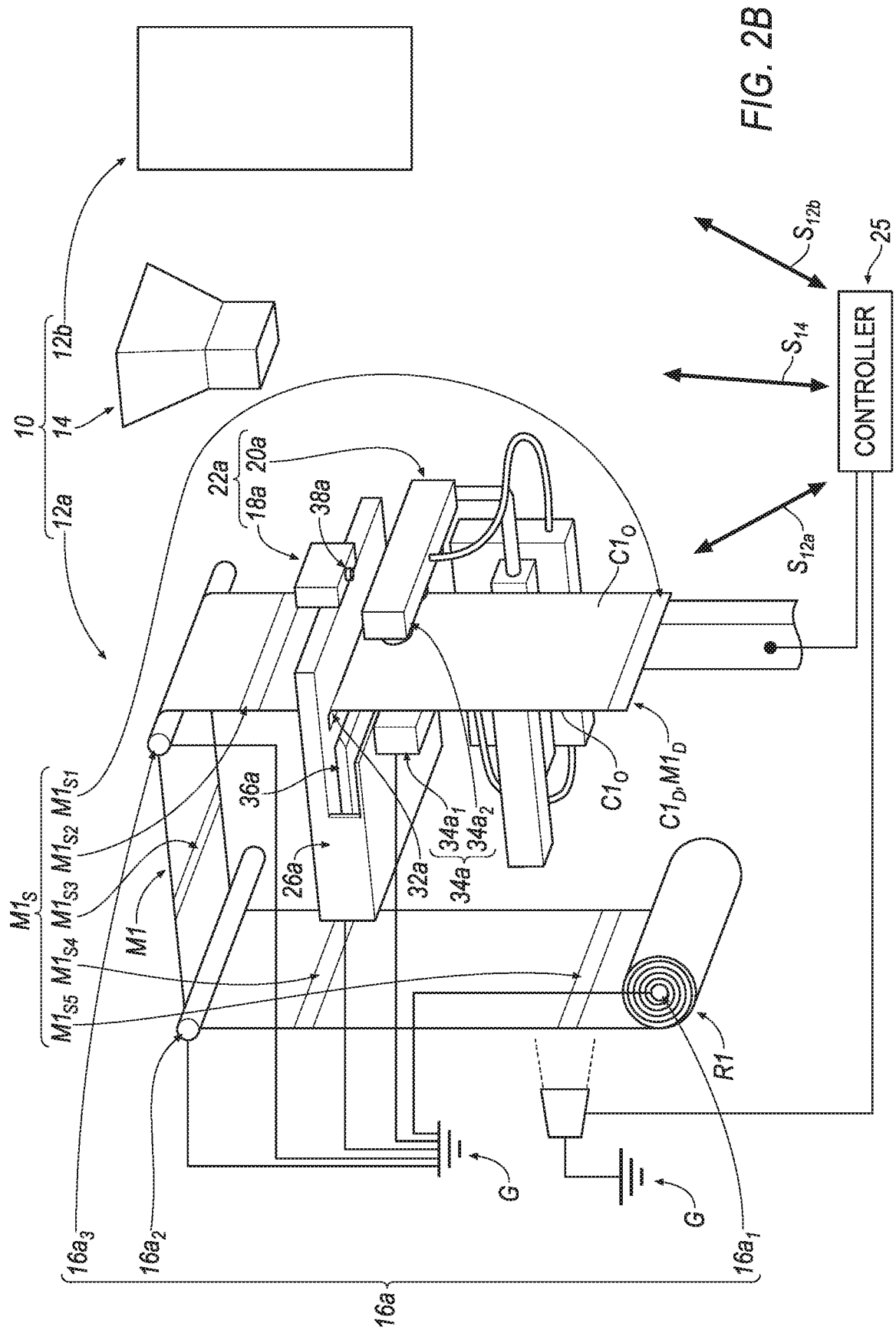

Referring to FIGS. 1B and 2B, the length of container material M1 is further spatially manipulated relative the first container preparation system 12*a* such that the length of container material M1 is shown arranged through the container material severing device 18*a*. In an example, the length of container material M1 is shown arranged through: (1) the upstream opening 30*a*, (2) the passage 28*a* and (3) the downstream opening 32*a* such that the distal end $M1_D$ of the length of container material M1 is arranged downstream of the container material severing device 18*a*.

Figure 2C:
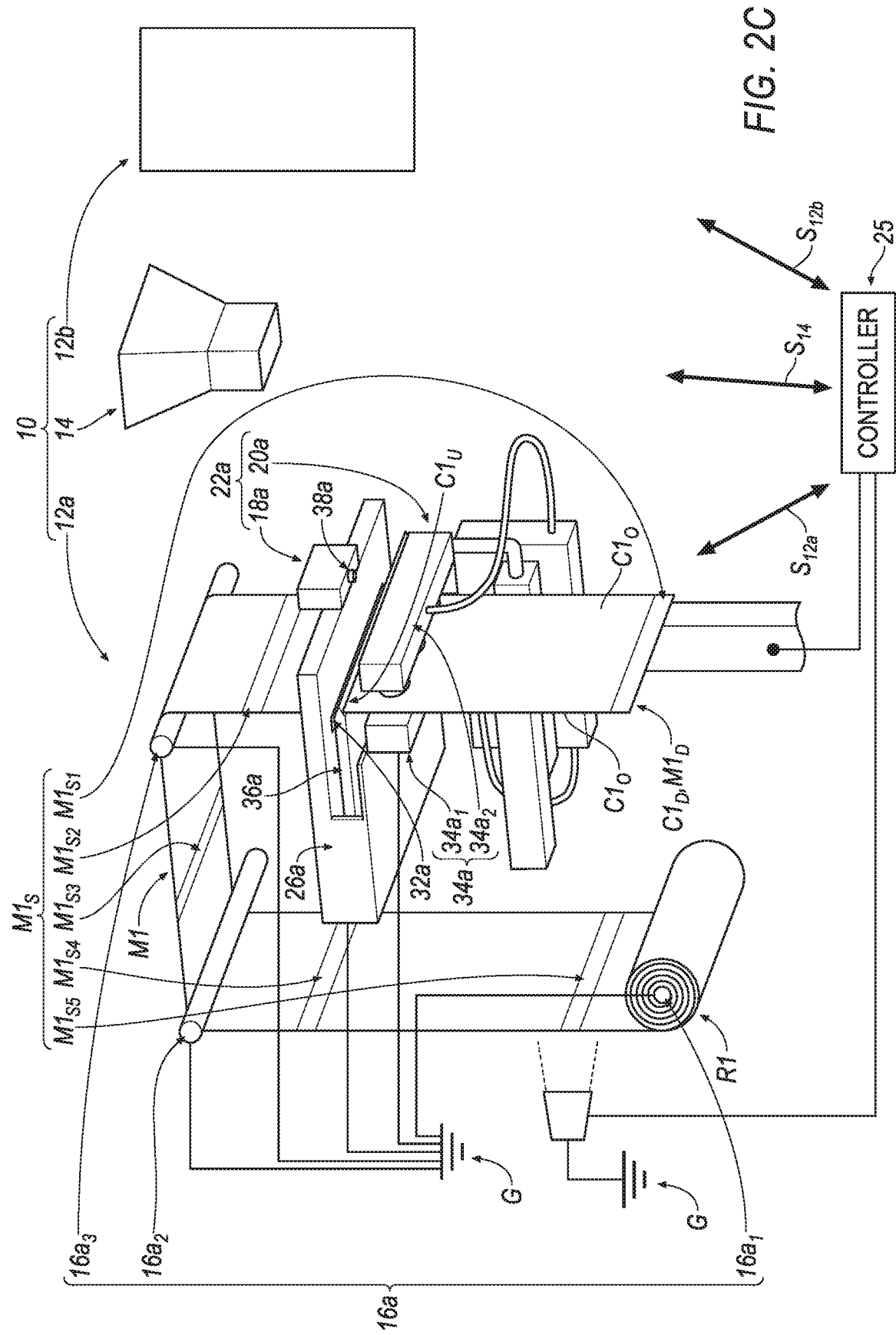

Referring to FIGS. 1C and 2C, the length of container material M1 is manipulated by the first container preparation system 12a upon actuation of the container material severing device 18a and the severed container material transporting device 20a. Actuation of the container material severing device 18a and the severed container material transporting device 20a may occur in response to the sensor 24a optically detecting a trailing segmenting portion (see, e.g., $M1_{S5}$ in FIG. 2B) of the plurality of segmenting portion $M1_S$, and, as a result of detecting the trailing segmenting portion (see, e.g., Miss in FIG. 2B) of the plurality of segmenting portion $M1_S$, the sensor 24a may send a signal to the controller 25 such that the controller 25 may then send an actuation signal (see, e.g., $S_{12a}$) to the container material severing device 18a and the severed container material transporting device 20a for engaging and severing the leading first container C1 of the plurality of first containers C1 from the length of container material M1 as described below.

As seen in FIGS. 1C and 2C, the severed container material transporting device 20a includes at least one pair of container material engaging portions 34a, including a first container material engaging portion $34a_1$ and a second container material engaging portion $34a_2$. Each of the first container material engaging portion $34a_1$ and the second container material engaging portion $34a_2$ may include at least one suction device (e.g., at least one suction cup) that selectively engages and/or retains an outer sidewall surface $C1_O$ of the leading first container C1 thereto. The first container material engaging portion $34a_1$ and the second container material engaging portion $34a_2$ may be arranged in an opposing relationship such that each of the first container material engaging portion $34a_1$ and the second container material engaging portion $34a_2$ may engage opposite portions of the outer sidewall surfaces $C1_O$ of the leading first container C1 proximate the upstream end $C1_U$ of the leading first container C1. In an example, actuation of the container material severing device 18a and the severed container material transporting device 20a may result in (1) the first container material engaging portion $34a_1$ and the second container material engaging portion $34a_2$ of the severed container material transporting device 20a firstly engaging opposite outer sidewall surfaces $C1_O$ of the leading first container C1 for spatially fixing in place the leading first container C1 relative the container material severing device 18a and (2) actuating a material severing portion 36a (e.g., a blade, knife, laser or the like) extending away from the body 26a of the container material severing device 18a such that the material severing portion 36a severs the leading first container C1 (e.g., along the leading segmenting portion $M1_{S1}$) from the length of container material M1.

Figure 1D:
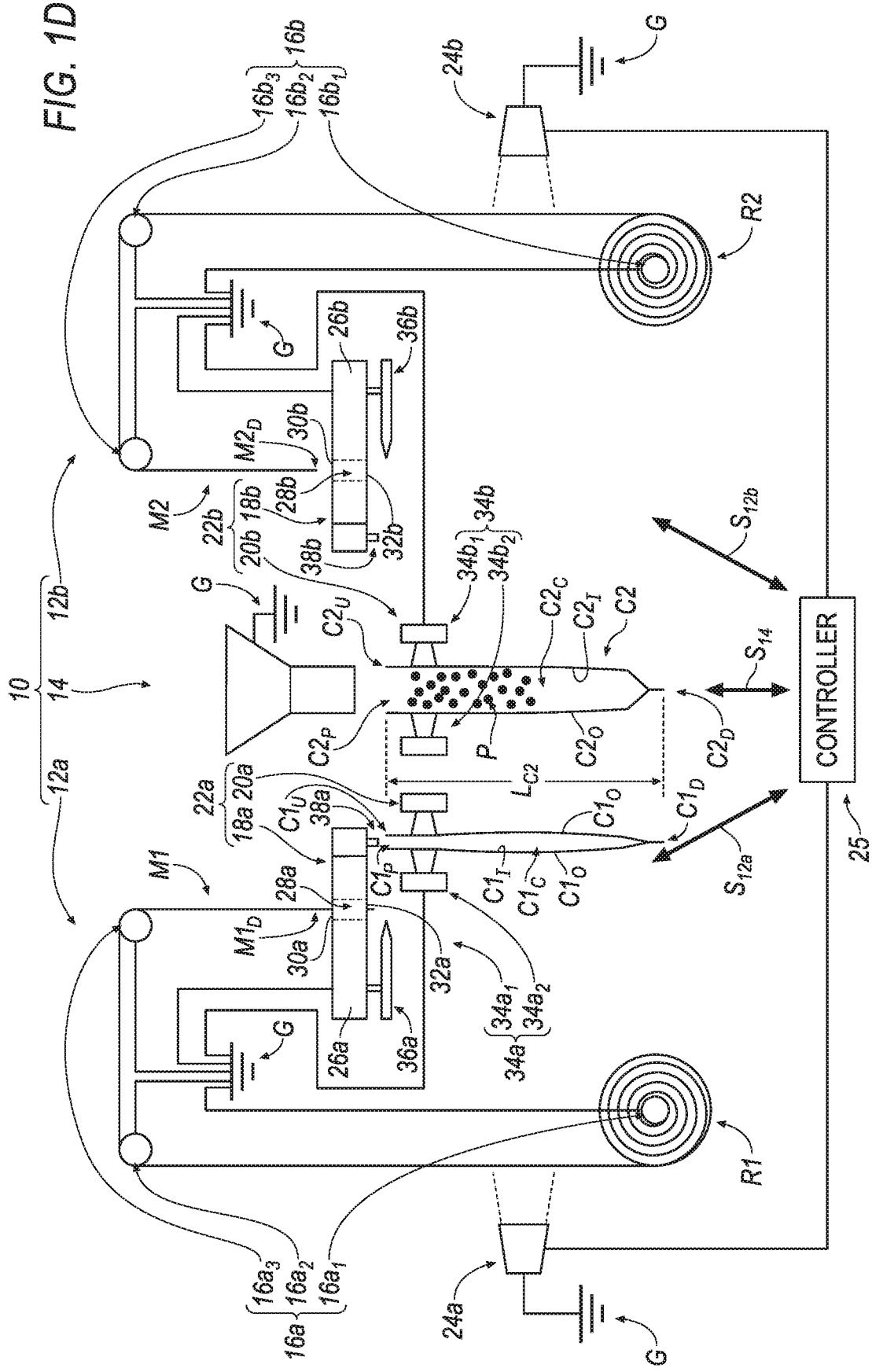
Figure 2D:
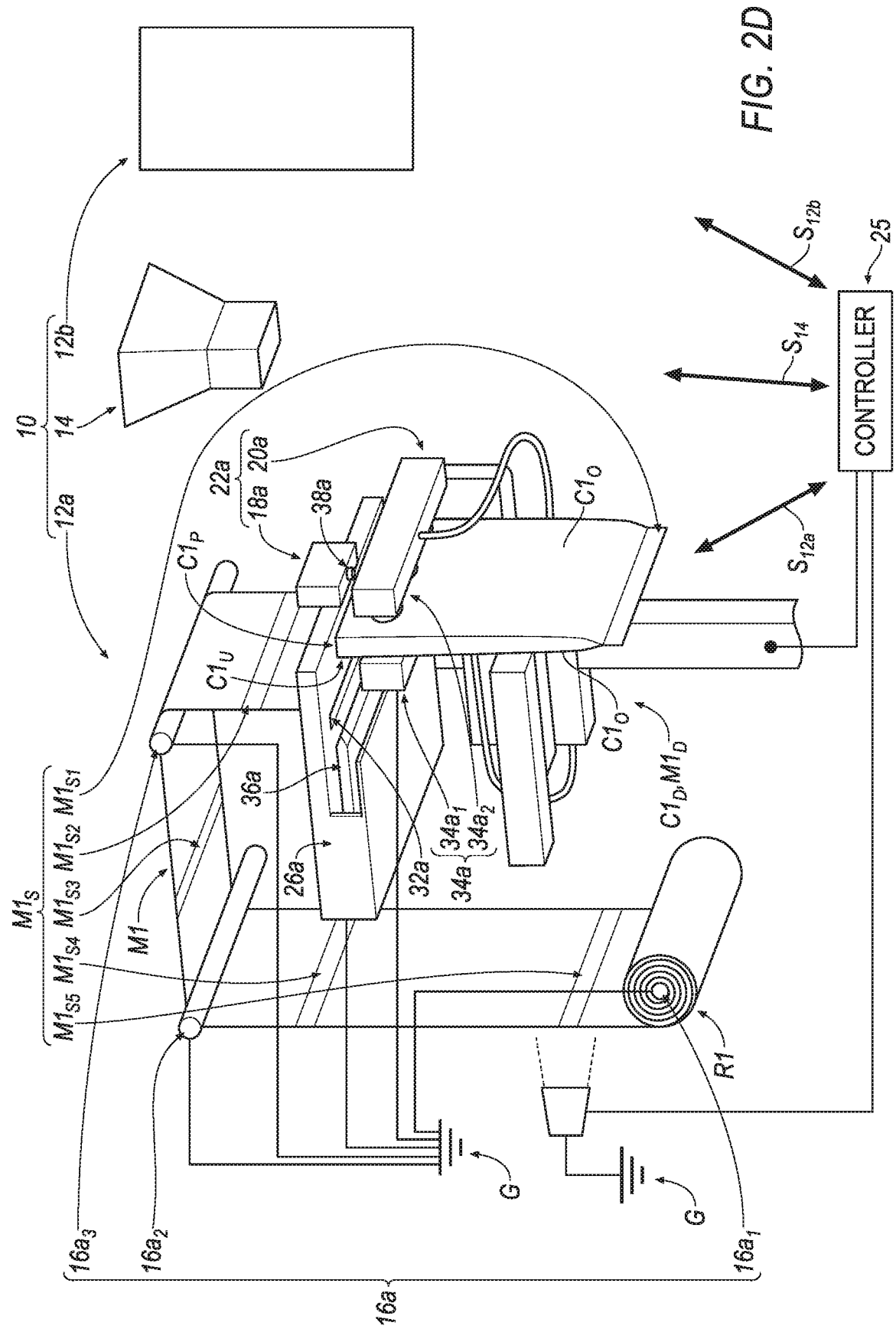
Figure 2E:
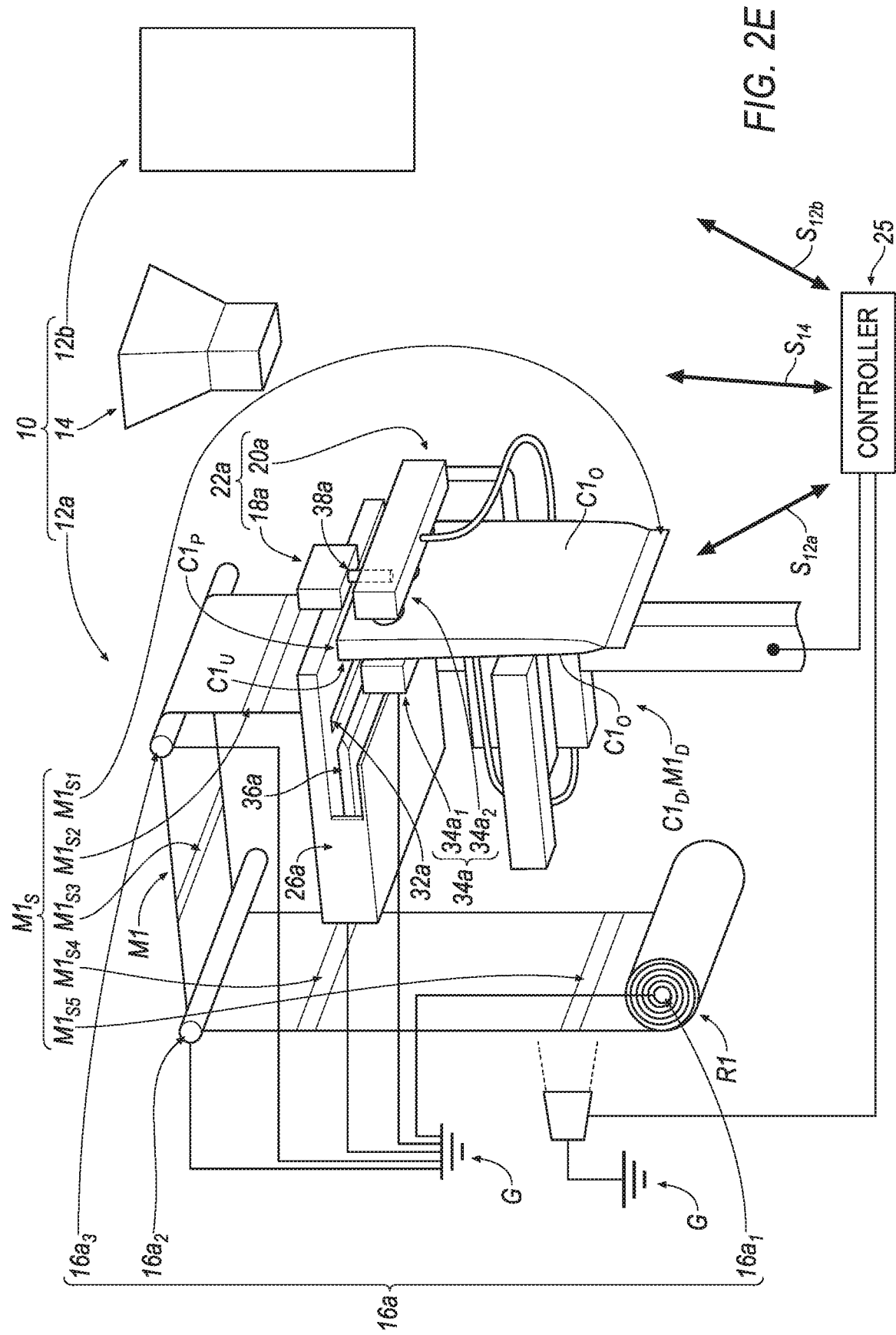

Referring to FIGS. 1D and 2D, the severed container material transporting device 20a may be further actuated as follows. In an example, (1) the at least one pair of first container material engaging portions 34a of the severed container material transporting device 20a transports the severed leading first container C1 away from the material severing portion 36a and toward an inflator portion 38a extending away from the body 26a of the container material severing device 18a and (2) the first container material engaging portion $34a_1$ and the second container material engaging portion $34a_2$ of the severed container material transporting device 20a may be spatially aned in opposing directions to arrange the severed leading first container C1 in a partially open orientation such that the upstream passage $C1_P$ of the severed leading first container C1 is arranged in an opposing relationship with respect to the inflator portion 38a. Thereafter, as seen in FIGS. 1E and 2E, the container material severing device 18a may be further actuated for causing the inflator portion 38a to be extended away from the body 26a of the container material severing device 18a such that the inflator portion 38a is passed through the upstream passage $C1_P$ of the severed leading first container C1 and into the product-receiving cavity $C1_C$ of the severed leading first container C1.

Figure 1F:
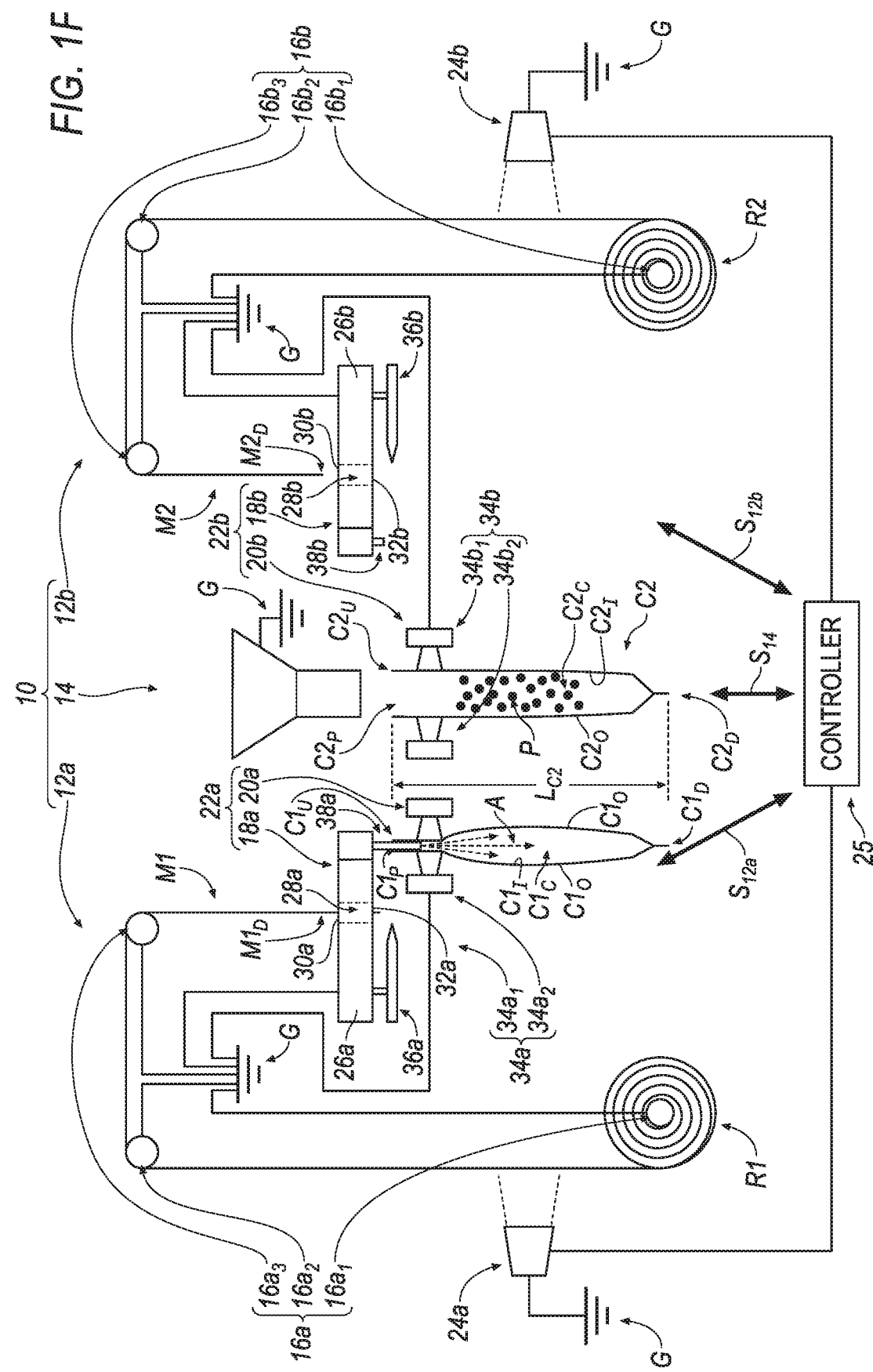
Figure 2F:
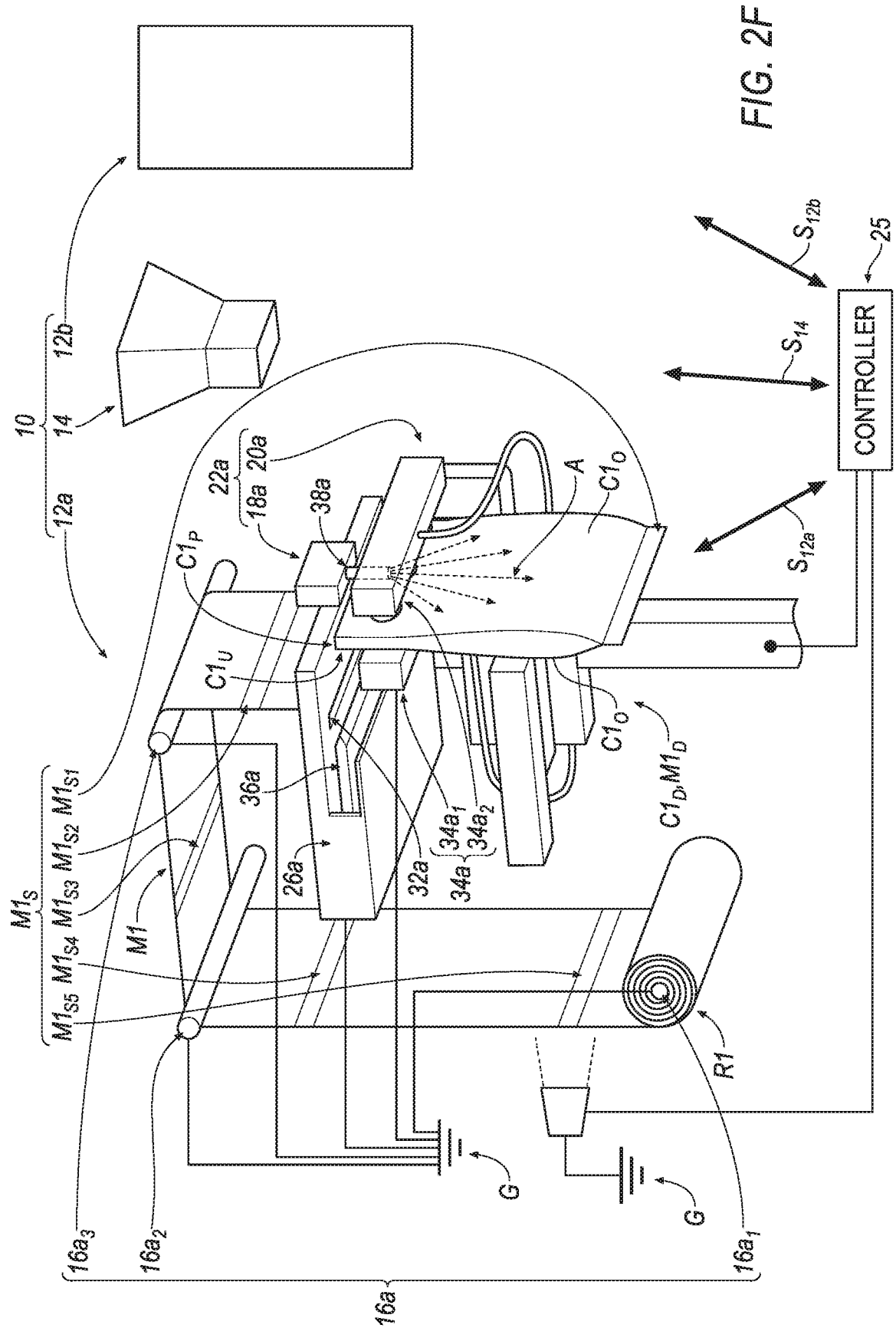
Figure 2G:
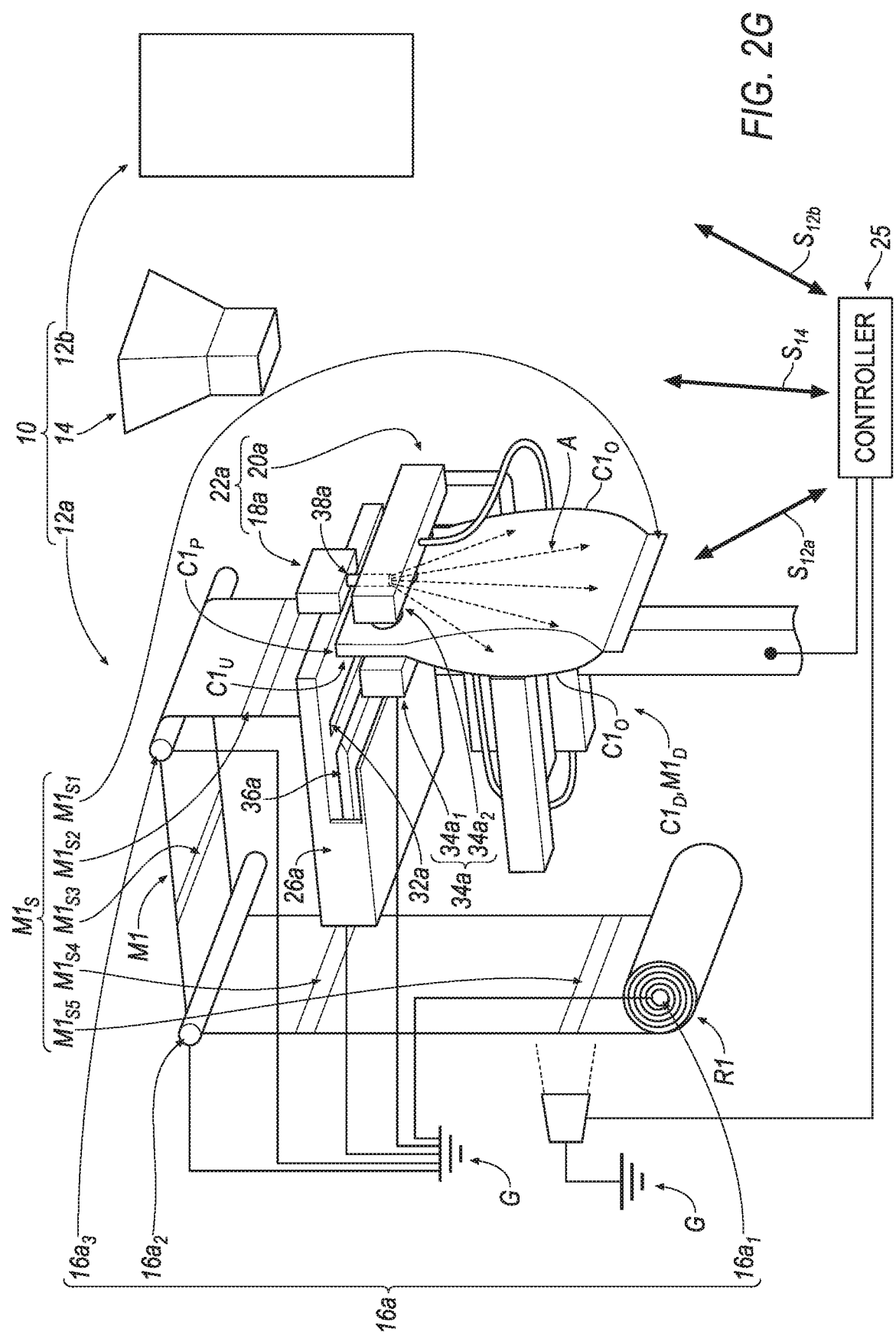

Referring to FIGS. 1F and 2F, the container expander 22a may be actuated in order to expel pressurized fluid A (e.g., air) from the inflator portion 38a for receipt within the product-receiving cavity $C1_C$ of the severed leading first container C1 in order to cause opposing inner surfaces $C1_I$ of the severed leading first container C1 to be moved away from one another. Thereafter, as seen in FIGS. 1G and 2G, the inflator portion 38a may continue to expel the pressurized fluid A from the inflator portion 38a into the product-receiving cavity $C1_C$ of the severed leading first container C1 in order substantially expand the product-receiving cavity $C1_C$ of the severed leading first container C1 to a desired volume (e.g., a maximum volume) in order to subsequently receive a desired amount of the product P from the product metering device 14.

Figure 1H:
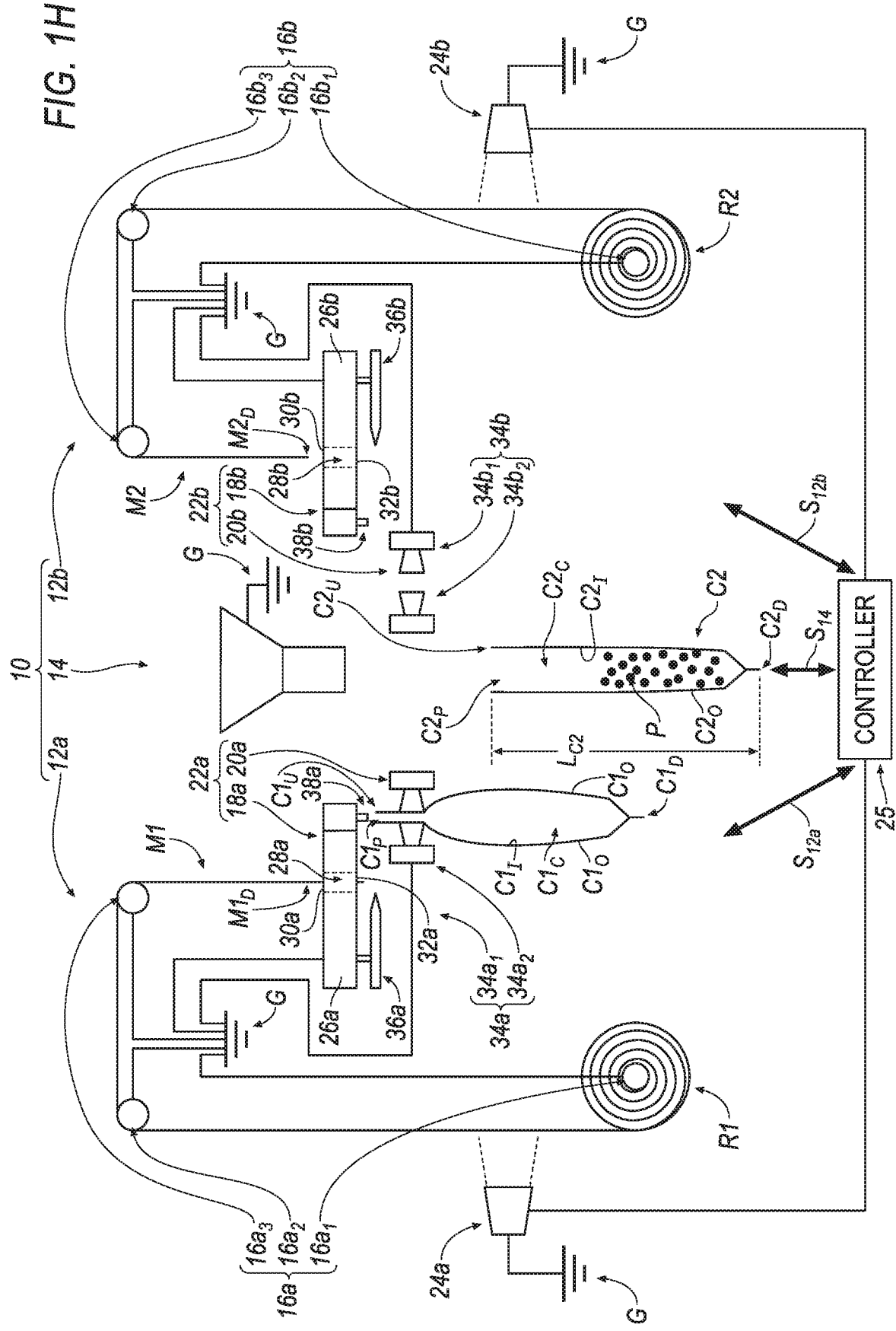
Figure 1T:
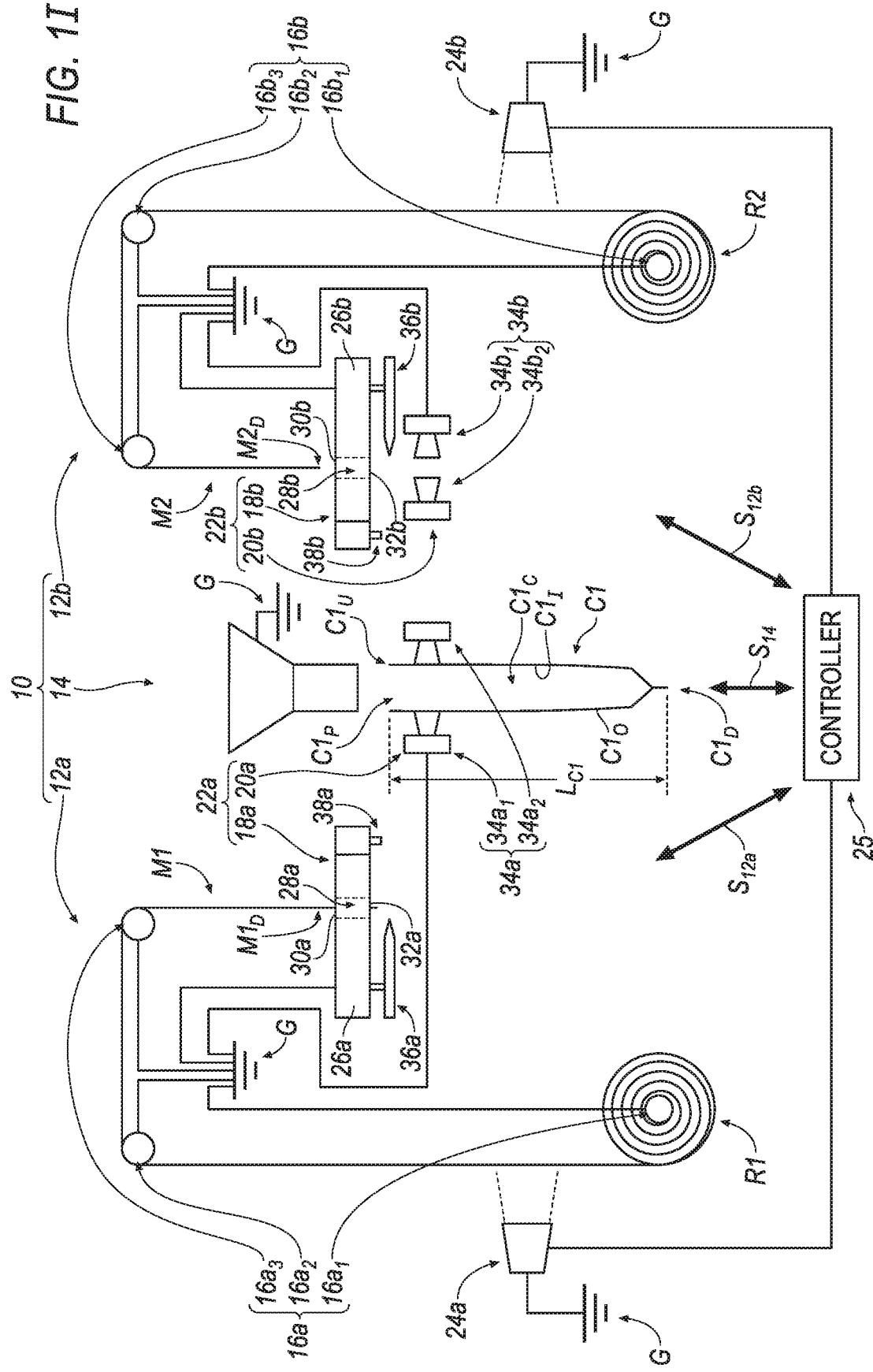
Figure 2H:
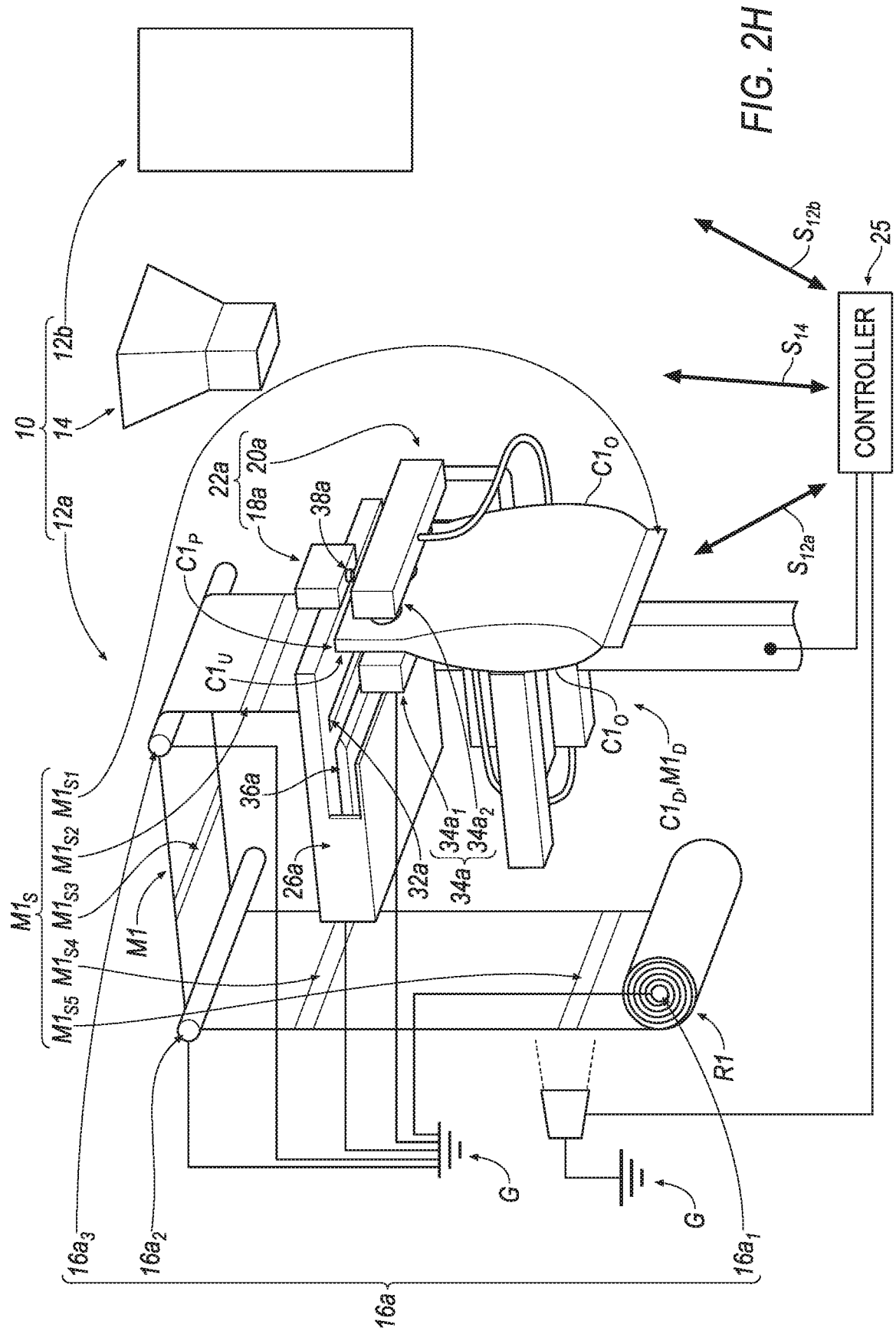

Referring to FIGS. 1H and 2H, once the product-receiving cavity $C1_C$ of the severed leading first container C1 has been expanded to the desired volume, the container material severing device 18a may be further actuated for causing the inflator portion 38a to be retracted from the product-receiving cavity $C1_C$ of the severed leading first container C1 and back toward the body 26a of the container material severing device 18a such that the inflator portion 38a is no longer arranged through the upstream passage $C1_P$ of the severed leading first container C1 and within the product-receiving cavity $C1_C$ of the severed leading first container C1. As also seen in FIG. 1H, the second container C2 that was immediately previously filled with the product P from the product metering device 14 is moved away from the product metering device 14 in order to provide a clearance for subsequent arrangement of the severed leading first container C1 under the product metering device 14.

Figure 1K:
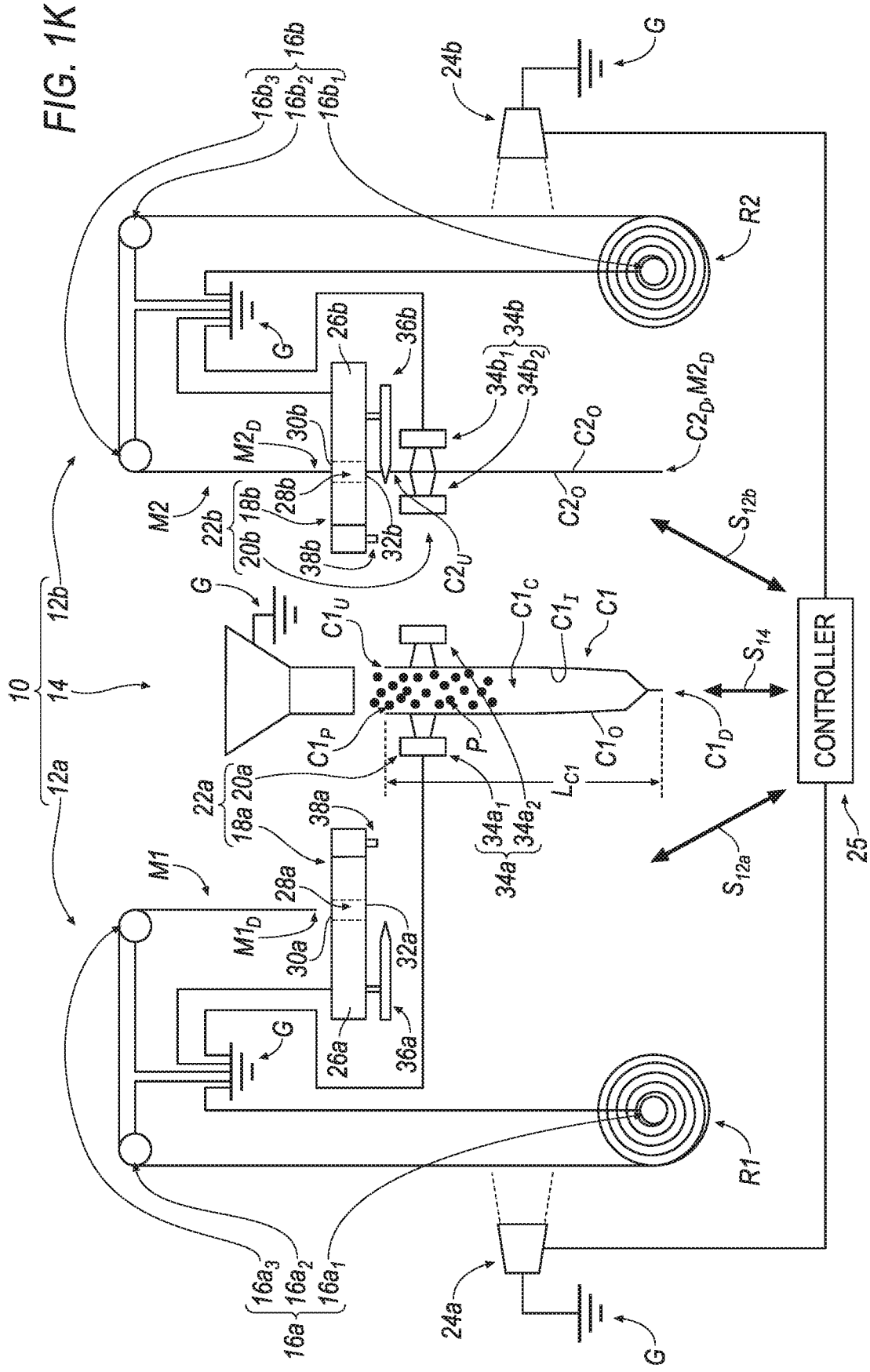
Figure 1L:
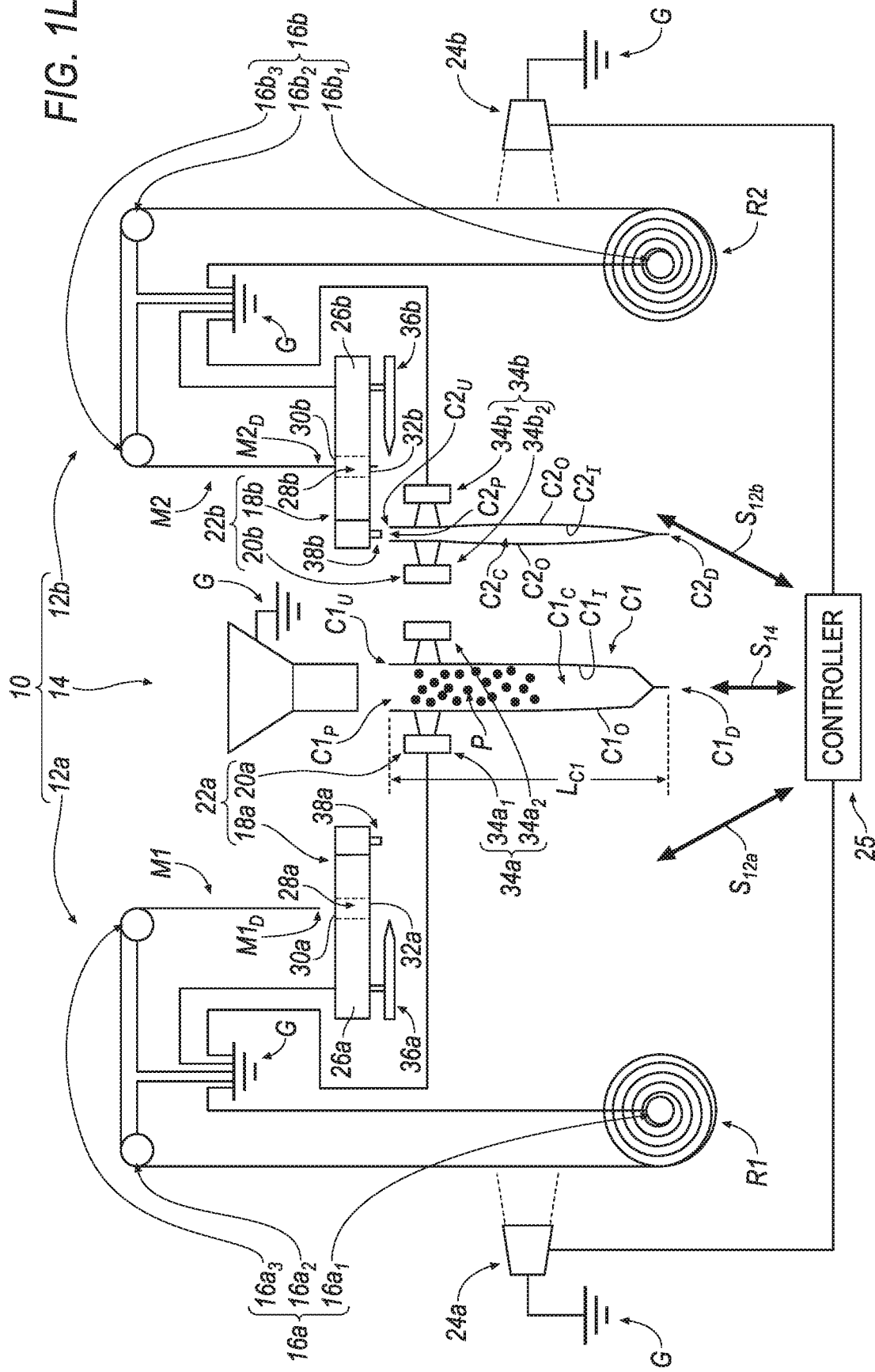
Figure 1M:
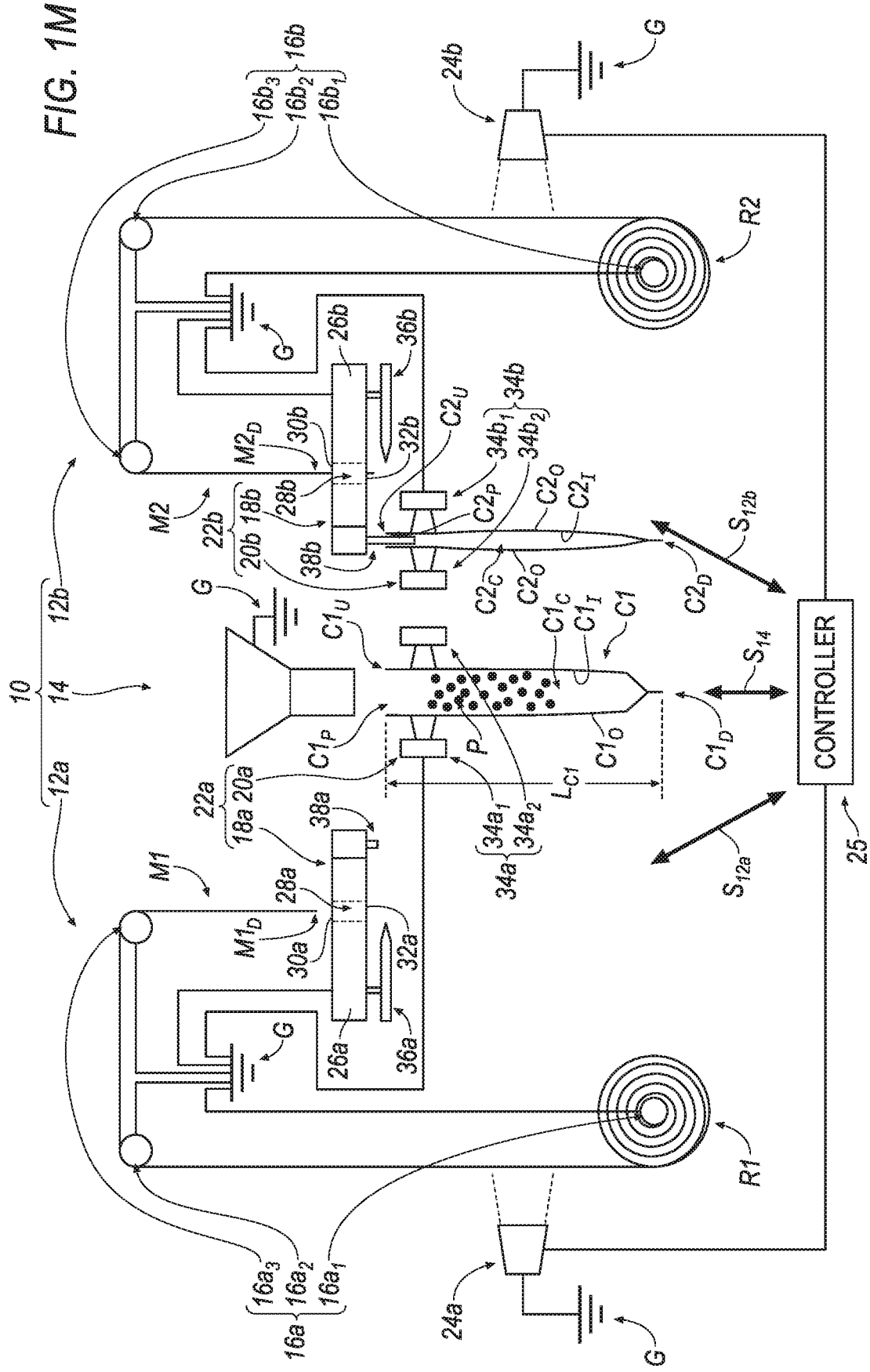
Figure 1N:
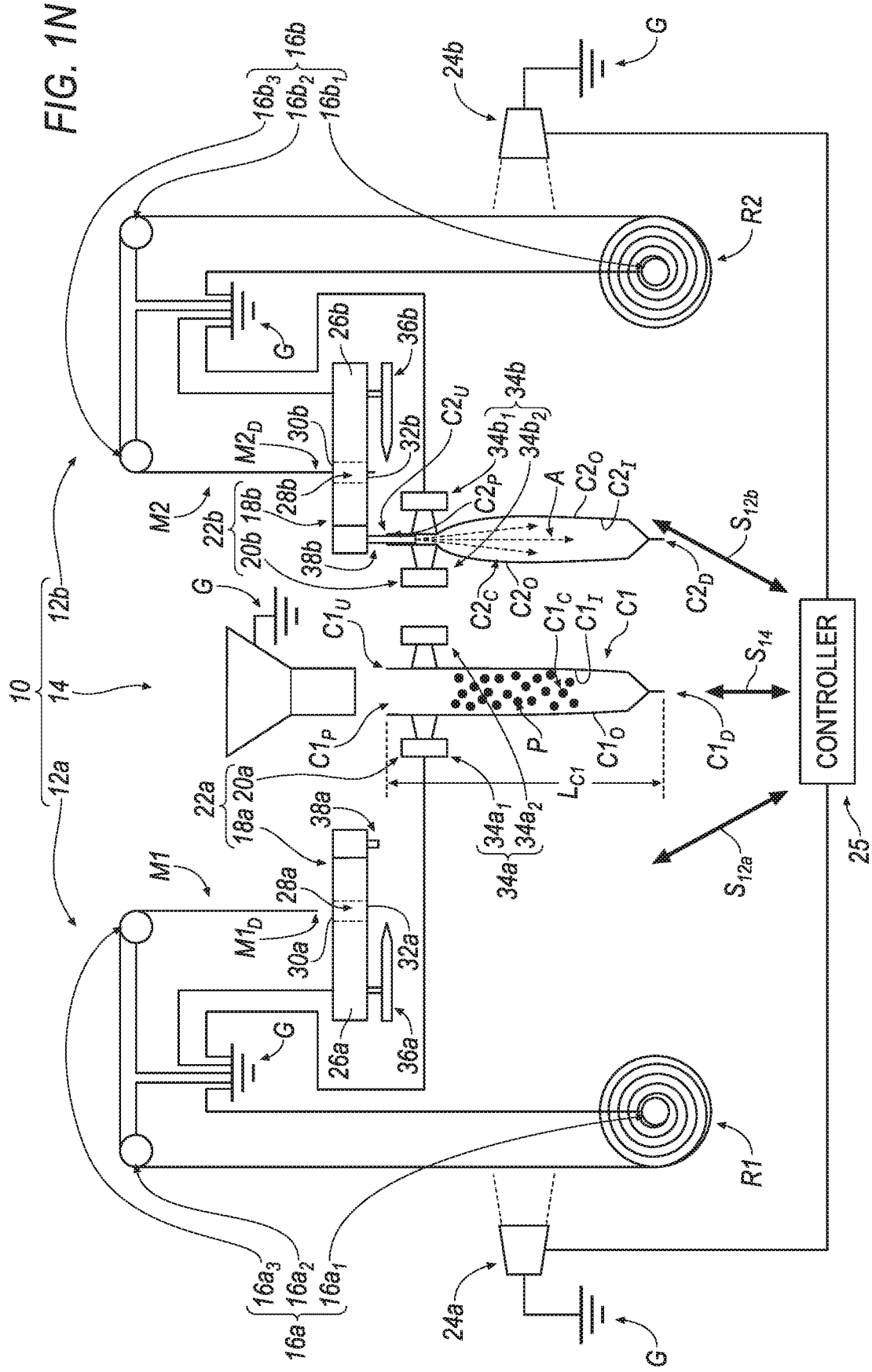
Figure 10:
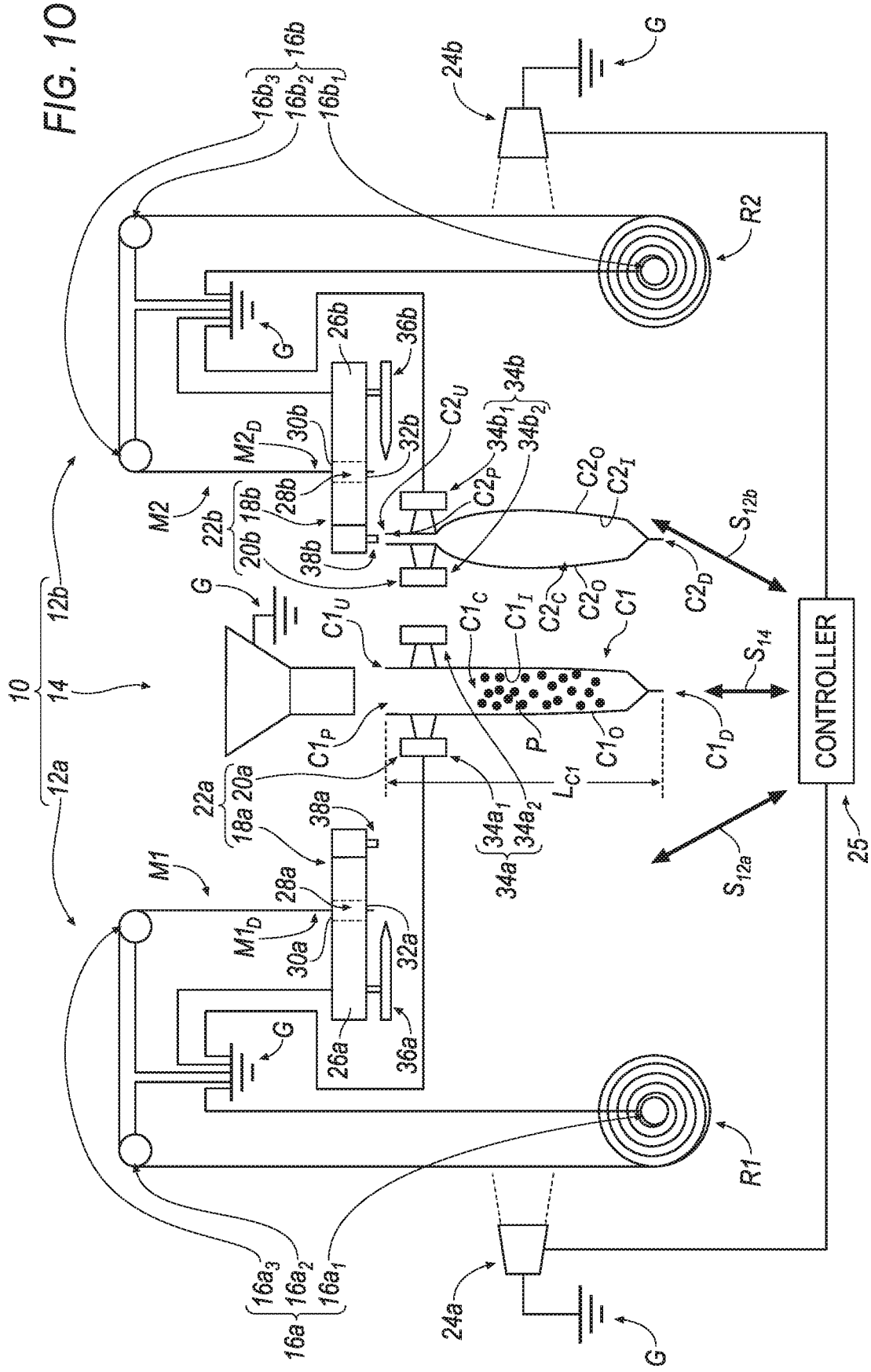
Figure 2I:
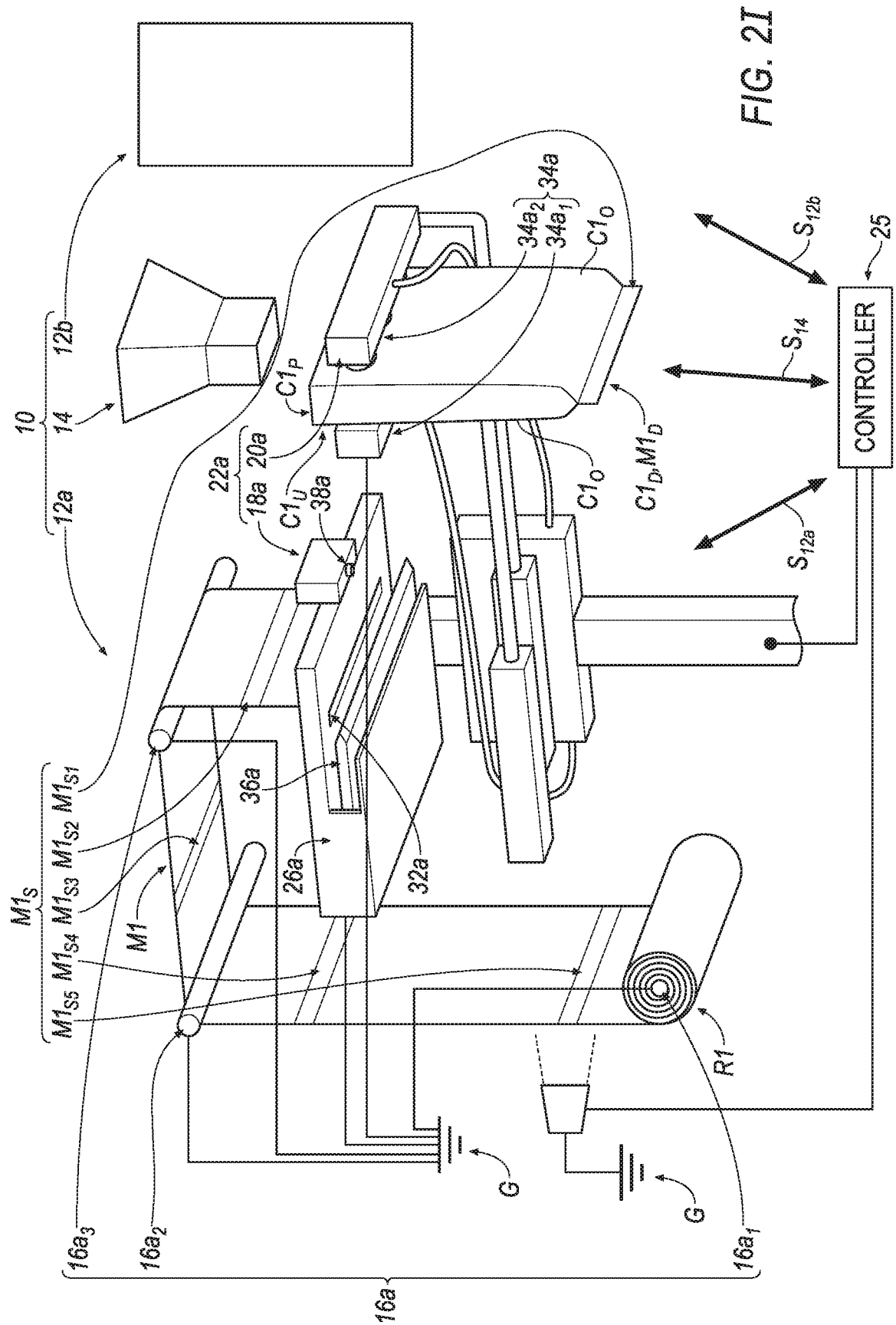
Figure 2J:
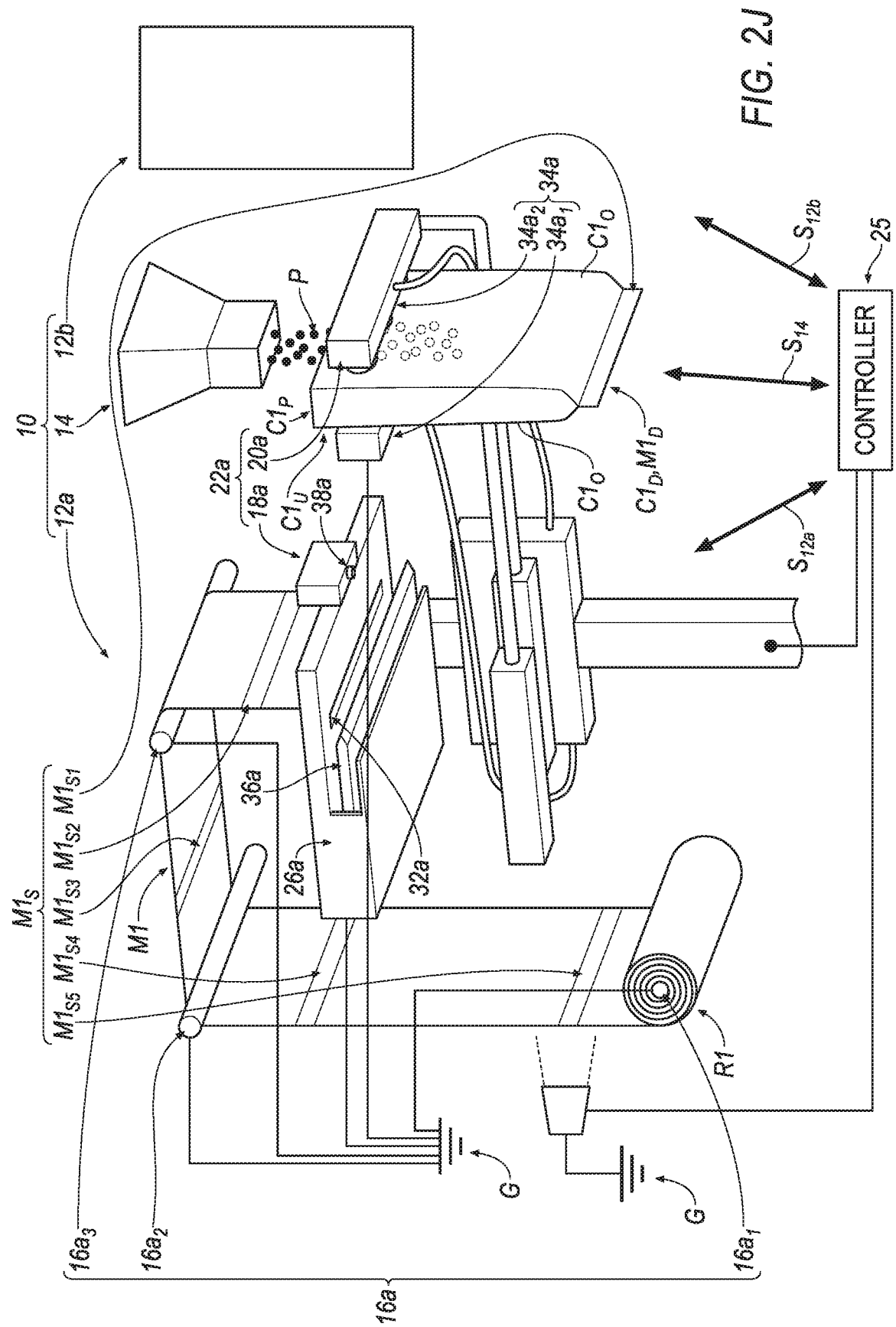

As seen in FIGS. 1I and 2I, the severed container material transporting device 20a may be further actuated for causing the at least one pair of first container material engaging portions 34a of the severed container material transporting device 20a to transport the severed and expanded leading first container C1 away from the material inflator portion 38a for arrangement under the product metering device 14. Thereafter, as see in FIGS. 1J-1O and 2J, the product metering device 14 may be actuated for metering the product P through the upstream passage $C1_P$ of the severed and expanded leading first container C1 and into the product-receiving cavity $C1_C$ of the severed and expanded leading first container C1. The severed, expanded, and filled leading first container C1, including the amount of product P arranged therein, may be sealed (by a sealing device, not shown) prior to or after being moved away from the product metering device 14 in order to provide a clearance for subsequent arrangement of a severed and expanded second container C2 under the product metering device 14.

As described below at FIGS. 1I-1O, a methodology for preparing the second container C2 and subsequently arranging the prepared second container C2 under the product metering device 14 is described according to an exemplary embodiment.

Referring to FIG. 1I, the length of container material M2 is drawn away from the roll R2 such that a distal end $M2_D$ of the length of container material M2 is arranged downstream of the plurality of container material support members 16b. As seen in FIG. 1I, the distal end M2$_D$ of the length of container material M2 is arranged downstream of the third support member 16b$_3$ of the plurality of container material support members 16b. Furthermore, the distal end M2$_D$ of the length of container material M2 may define a downstream end C2$_D$ of a trailing second container C2 of a plurality of second containers C2 provided by the length of container material M2 that is drawn away from the roll R2 (in an implementation, the following description refers to a "trailing" second container C2 due to a "leading" second container C2 being previously prepared and shown at FIGS. 1A-1H).

Referring to FIG. 1I, the container material severing device 18b includes a body 26b defining a passage 28b extending there-through. The passage 28b is accessible by an upstream opening 30b and a downstream opening 32b. As seen in FIG. 1I, the distal end M2$_D$ of the length of container material M2 is arranged upstream of the container material severing device 18b such that the distal end M2$_D$ of the length of container material M2 is arranged opposite the upstream opening 30b. A device (not shown) for drawing the length of container material M2 from the roll R2 may be arranged within the passage 28b for drawing the length of container material M2 from the roll R2.

Referring to FIG. 1J, the length of container material M2 is further spatially manipulated relative the second container preparation system 12b such that the length of container material M2 is shown arranged through the container material severing device 18b. In an example, the length of container material M2 is shown arranged through: (1) the upstream opening 30b, (2) the passage 28b and (3) the downstream opening 32b such that the distal end M2$_D$ of the length of container material M2 is arranged downstream of the container material severing device 18b.

Referring to FIG. 1K, the length of container material M2 is manipulated by the second container preparation system 12b upon actuation of the container material severing device 18b and the severed container material transporting device 20b. Actuation of the container material severing device 18b and the severed container material transporting device 20b may occur in response to the sensor 24b optically detecting a trailing segmenting portion (in a substantially similar manner, see, e.g., M1$_{S5}$ in FIG. 2B) of the plurality of segmenting portion (in a substantially similar manner, see, e.g., M1$_S$ in FIG. 2B) and, as a result of detecting the trailing segmenting portion of the plurality of segmenting portion, the sensor 24b may send a signal to the controller 25 such that the controller 25 may then send an actuation signal (see, e.g., S$_{12b}$) to the container material severing device 18b and the severed container material transporting device 20b for engaging and severing the trailing second container C2 of the plurality of second containers C2 from the length of container material M2 as described below.

As seen in FIG. 1K, the severed container material transporting device 20b includes at least one pair of container material engaging portions 34b, including a first container material engaging portion 34b$_1$ and a second container material engaging portion 34b$_2$. Each of the first container material engaging portion 34b$_1$ and the second container material engaging portion 34b$_2$ may include at least one suction device (e.g., at least one suction cup) that selectively engages and/or retains an outer sidewall surface C2$_O$ of the trailing second container C2 thereto. The first container material engaging portion 34b$_1$ and the second container material engaging portion 34b$_2$ may be arranged in an opposing relationship such that each of the first container material engaging portion 34b$_1$ and the second container material engaging portion 34b$_2$ may engage opposite portions of the outer sidewall surfaces C2$_O$ of the trailing second container C2 proximate the upstream end C2$_U$ of the trailing second container C2. In an example, actuation of the container material severing device 18b and the severed container material transporting device 20b may result in (1) the first container material engaging portion 34b$_1$ and the second container material engaging portion 34b$_2$ of the severed container material transporting device 20b firstly engaging opposite outer sidewall surfaces C2$_O$ of the trailing second container C2 for spatially fixing in place the trailing second container C2 relative the container material severing device 18b and (2) actuating a material severing portion 36b (e.g., a blade, knife, laser or the like) extending away from the body 26b of the container material severing device 18b such that the material severing portion 36b severs the trailing second container C2 from the length of container material M2.

Referring to FIG. 1L, the severed container material transporting device 20b may be further actuated as follows. In an example, (1) the at least one pair of first container material engaging portions 34b of the severed container material transporting device 20b transports the severed trailing second container C2 away from the material severing portion 36b and toward an inflator portion 38b extending away from the body 26b of the container material severing device 18b and (2) the first container material engaging portion 34b$_1$ and the second container material engaging portion 34b$_2$ of the severed container material transporting device 20b may be spatially manipulated in opposing directions to arrange the severed trailing second container C2 in a partially open orientation such that the upstream passage C2$_P$ of the severed trailing second container C2 is arranged in an opposing relationship with respect to the inflator portion 38b. Thereafter, as seen in FIG. 1M, the container material severing device 18b may be further actuated for causing the inflator portion 38b to be extended away from the body 26b of the container material severing device 18b such that the inflator portion 38b is passed through the upstream passage C2$_P$ of the severed trailing second container C2 and into the product-receiving cavity C2$_C$ of the severed trailing second container C2.

Referring to FIG. 1N, the container expander 22b may be actuated in order to expel pressurized fluid A (e.g., air) from the inflator portion 38b for receipt within the product-receiving cavity C2$_C$ of the severed trailing second container C2 in order to cause opposing inner surfaces C2$_I$ of the severed trailing second container C2 to be moved away from one another. Thereafter, the inflator portion 38b may continue to expel the pressurized fluid A from the inflator portion 38b into the product-receiving cavity C2$_C$ of the severed trailing second container C2 in order substantially expand the product-receiving cavity C2$_C$ of the severed trailing second container C2 to a desired volume (e.g., a maximum volume) in order to subsequently receive a desired amount of the product P from the product metering device 14.

Referring to FIG. 1O, once the product-receiving cavity C2$_C$ of the severed trailing second container C2 has been expanded to the desired volume, the container material severing device 18b may be further actuated for causing the inflator portion 38b to be retracted from the product-receiving cavity C2$_C$ of the severed trailing second container C2 and back toward the body 26b of the container material severing device 18b such that the inflator portion 38b is no longer arranged through the upstream passage C2$_P$ of the severed trailing second container C2 and within the product-receiving cavity C2$_C$ of the severed trailing second container C2. As also seen in FIG. 1O, the leading first container C1 that was immediately previously filled with the product P from the product metering device 14 is arranged for movement away from the product metering device 14 in order to provide a clearance for subsequent arrangement of the severed trailing second container C2 under the product metering device 14.

In a substantially similar manner as seen in FIG. 1A with respect to the leading second container C2, once the leading first container C1 is moved away from the product metering device 14, the severed container material transporting device 20b may be further actuated for causing the at least one pair of first container material engaging portions 34b of the severed container material transporting device 20b to transport the severed and expanded trailing second container C2 away from the material inflator portion 38b for arrangement under the product metering device 14. Thereafter, as seen in a substantially similar manner in FIGS. 1B-1H, the product metering device 14 may be actuated for metering the product P through the upstream passage C2$_P$ of the severed and expanded trailing second container C2 and into the product-receiving cavity C2$_C$ of the severed and expanded trailing second container C2. The severed, expanded and filled trailing second container C2 including the amount of product P arranged therein may be sealed (by a sealing device, not shown) prior to or after being moved away from the product metering device 14 in order to provide a clearance for subsequent arrangement of a severed and expanded first container C1 under the product metering device 14.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
dispensing a first container from a first container preparation system that includes a first container expander, the first container expander including a first transportation device and a first severing device;
opening the first container via the first container expander;
metering a first amount of product from a product metering device into the first container; and
dispensing a second container from a second container preparation system that includes a second container expander, the second container expander including a second transportation device and a second severing device, wherein dispensing the second container occurs concurrently with the metering of the first amount of product into the first container.

2. The method of claim 1, wherein dispensing the second container from the second container preparation system includes deriving the second container from a continuous length of container material.

3. The method of claim 1, wherein dispensing the second container from the second container preparation system includes severing a container material via the second severing device to define the second container.

4. The method of claim 3, further comprising the steps of:
transporting the first container away from the product metering device via the first transportation device and concurrently transporting the second container to the product metering device via the second transportation device.

5. The method of claim 1, wherein dispensing the second container from the second container preparation system includes expanding the second container via the second container expander.

6. The method of claim 5, wherein expanding the second container includes extending an inflator portion into the second container, expelling a pressurized fluid, and retracting the inflator portion from the second container.

7. The method of claim 1, wherein dispensing the second container includes receiving a container material between a first container material engaging portion and a second container material engaging portion, wherein the first container material engaging portion and the second container material engaging portion engage opposing outer sidewall surfaces.

8. The method of claim 7, wherein the step of dispensing the second container includes manipulating the first container material engaging portion and the second container material engaging portion in opposing directions to partially open an upstream passage of the second container.

9. The method of claim 8, wherein the step of dispensing the second container includes expanding the second container by expelling a pressurized fluid into the second container through the upstream passage.

10. A method comprising:
dispensing a first container from a first container preparation system that includes a first container expander, the first container expander including a first transportation device and a first severing device;
opening the first container via the first container expander;
metering a first amount of product from a product metering device into the first container; and
dispensing a second container from a second container preparation system that includes a second container expander, the second container expander including a second transportation device and a second severing device, the second container dispensed by:
receiving a container material between a first container material engaging portion and a second container material engaging portion, wherein the first container material engaging portion and the second container material engaging portion engage opposing outer sidewall surfaces;
severing a container material via the second severing device to define the second container;
manipulating the first container material engaging portion and the second container material engaging portion in opposing directions to partially open an upstream passage of the second container; and
expanding the second container by expelling a pressurized fluid from a retractable inflator portion into the second container through the upstream passage.

* * * * *